US012760988B2

(12) United States Patent
Mitchell

(10) Patent No.: US 12,760,988 B2
(45) Date of Patent: Oct. 13, 2026

(54) WEAPON STABILIZATION DEVICE

(71) Applicant: Isaac David Mitchell, Mounds View, MN (US)

(72) Inventor: Isaac David Mitchell, Mounds View, MN (US)

( * ) Notice: Subject to any disclaimer, the term of this patent is extended or adjusted under 35 U.S.C. 154(b) by 5 days.

(21) Appl. No.: 19/190,522

(22) Filed: Apr. 25, 2025

(65) Prior Publication Data

US 2025/0334372 A1 Oct. 30, 2025

Related U.S. Application Data

(60) Provisional application No. 63/638,806, filed on Apr. 25, 2024.

(51) Int. Cl.

| | |
|---|---|
| ***F41C 23/14*** | (2006.01) |
| ***F16M 13/04*** | (2006.01) |
| ***F41C 23/20*** | (2006.01) |

(52) U.S. Cl.

CPC ............ *F41C 23/14* (2013.01); *F16M 13/04* (2013.01); *F41C 23/20* (2013.01)

(58) Field of Classification Search

CPC .......... F41C 23/00; F41C 23/20; F41C 23/52; F41C 23/14; F41C 33/001; F41C 33/003; F41C 33/007; F16M 13/04

See application file for complete search history.

(56) References Cited

U.S. PATENT DOCUMENTS

| | | | | |
|---|---|---|---|---|
| 476,246 | A * | 6/1892 | Burgess | F41A 9/18 42/74 |
| 6,651,371 | B2 * | 11/2003 | Fitzpatrick | F41C 23/04 42/71.01 |
| 8,215,045 | B2 * | 7/2012 | Mitchell | F41C 23/20 42/72 |
| 9,581,411 | B2 * | 2/2017 | Zusman | F41C 23/22 |
| 10,012,470 | B2 * | 7/2018 | Johnson | F41C 23/20 |
| 10,527,385 | B1 * | 1/2020 | Schumacher | F41C 23/14 |
| 11,085,732 | B2 * | 8/2021 | Guillerm | F41C 23/04 |
| 11,493,299 | B2 * | 11/2022 | Jacobson | F41A 11/00 |
| 11,703,304 | B2 * | 7/2023 | Hannah | F41A 3/84 42/71.01 |
| 11,732,998 | B2 * | 8/2023 | Angers, Jr. | F41C 23/04 42/73 |

(Continued)

*Primary Examiner* — Benjamin P Lee

(74) *Attorney, Agent, or Firm* — Michael A. Mochinski

(57) ABSTRACT

A weapon stabilization device for attachment to a weapon, which includes a stock chassis configured with an elongate body for housing a buffer tube associated with the weapon, an angular frame member connecting to the elongate body, a V-shaped brace attached to the angular frame member and elongate body, and a lock release assembly for disengaging a lockable mechanism associated with connection of the stock chassis to a shoulder chassis. The stock chassis also includes a pin-lock release assembly slidably mounted to a mounting rail of the elongate body and configured with an adjustable pin for engaging the buffer tube. The shoulder chassis includes a curvilinear shoulder plate connecting to a barreled section with an interior chamber for housing a primary rotational element of a dual-ball joint assembly, with the dual-ball joint assembly also including a secondary rotational element housed within the lockable mechanism and linked to the primary rotational element.

30 Claims, 21 Drawing Sheets

(56) References Cited

U.S. PATENT DOCUMENTS

| | | | | |
|---|---|---|---|---|
| 11,953,289 | B2 * | 4/2024 | Angers, Jr. | F41C 23/14 |
| 12,332,015 | B1 * | 6/2025 | Reis | F41C 23/14 |
| 12,435,948 | B2 * | 10/2025 | Angers, Jr. | F41C 23/14 |
| 12,480,732 | B1 * | 11/2025 | Schiedeman | F41A 23/16 |
| 2009/0229160 | A1 * | 9/2009 | Elliott | F41A 23/04<br>42/71.01 |
| 2011/0083353 | A1 * | 4/2011 | Mitchell | F41C 33/001<br>29/527.1 |
| 2015/0276343 | A1 * | 10/2015 | Zusman | F41C 23/22<br>42/71.01 |
| 2017/0356718 | A1 * | 12/2017 | Johnson | F41C 23/20 |
| 2018/0003459 | A1 * | 1/2018 | Miller | B21D 22/00 |
| 2019/0056193 | A1 * | 2/2019 | Blake | F41C 23/08 |
| 2019/0368839 | A1 * | 12/2019 | Schiedeman | F41A 23/52 |
| 2020/0182586 | A1 * | 6/2020 | Zhang | F41C 23/20 |
| 2021/0116210 | A1 * | 4/2021 | Guillerm | F41C 23/20 |
| 2022/0065582 | A1 * | 3/2022 | Spaulding | F41C 33/001 |
| 2023/0168064 | A1 * | 6/2023 | Angers, Jr. | F41C 23/14<br>42/73 |
| 2024/0255251 | A1 * | 8/2024 | Angers, Jr. | F41C 23/14 |

* cited by examiner

WEAPON STABILIZATION DEVICE

CROSS-REFERENCE TO RELATED APPLICATIONS

This application claims the benefit of U.S. Provisional Application No. 63/638,806, filed Apr. 25, 2024, entitled "Weapon Stabilization Device," the disclosures of which, including all attached documents, are incorporated herein by reference in their entirety for all purposes.

FIELD OF THE INVENTION

The present invention is largely directed to a weapon stabilization device for readily attaching to and detaching from a long gun or rifle of the type generally available to and used by tactical forces of the military and law enforcement, professional shooters, and recreational enthusiasts. The weapon stabilization device advances one's capabilities of developing a skill set for predictable, precise, reliable, and repeatable aim and shooting of the rifle while assuming a variety of shooting positions, often within limited time constraints.

BACKGROUND OF THE INVENTION

Precision shooting of handheld weaponry, particularly long guns or rifles typically of the type administered to members of the tactical forces and special operations of the military and law enforcement or used by professional shooters and recreational enthusiasts for competitive shooting events, requires one to learn a skill set in a demanding environment for a significant period of time, and if one can attain of level of innate proficiency to effectuate shots at long range (i.e., over 300 meters) repeatedly with accuracy and precision, one may perhaps become recognized as a sharpshooter or marksman, with the sharp shooter generally possessing superior skills in shooting and thus having a skill set generally qualifying for assignment within the elite special forces of the military or Special Weapons and Tactics (SWAT) teams of law enforcement. The ability to instinctively and effectively manage aiming and trigger control of the rifle within certain time constraints form the fundamentals of precision marksmanship. However, the distance to the adversarial target will generally dictate the level of requisite attention to accuracy, such that a long-range target may require strict adherence to the fundamentals to fulfill a precise and accurate shot, whereas a short-range target requires reactive immediacy with less attention to accuracy given the impending threat. Comparatively, competitive shooting events, such as those that may be part of the Olympic games and the like, the fundamentals of precision marksmanship equally apply, but perhaps more within the realm of a controlled environment where the target is one that is inanimate rather than adversarial in the case of combat and presents no impending danger to the shooter.

Regardless of the type of shooter and purpose, whether it be combative, competitive or recreational, the fundamentals of precision marksmanship may comprise seven factors common to all firing positions that affect the ability to hold the rifle steady, maintain proper sight alignment and sight picture, and control the trigger to fulfill accurate and precise shots repeatedly over time.

Firstly, forward hand placement establishes the amount of muscular tension one must apply to hold the weapon in a shootable position and provide for stable hold thereof. Accordingly, it is desirable that the forward hand be placed on the rife in a manner where there is vertical bone supporting the weight of the rifle, as muscles tend to fatigue more so than that of bone structure.

Secondly, the placement of the rifle's buttstock must be firmly placed in the pocket of the shoulder such to provide resistance to the rifle's recoil forces, allow for steady hold of the rifle, and prevent inadvertent slippage of the rifle's buttstock while discharging rounds of ammunition.

Thirdly, there must be a firm grip of the firing hand on the pistol grip to enable and maintain rearward pressure of the rifle's buttstock against the shoulder pocket.

Fourthly, the firing arm should be naturally positioned in a manner to promote balance of the rifle and form a pocket in the shoulder for comfortably receiving the rifle's buttstock, with the elbow remaining in a fairly consistent position from shot to shot so as to ensure constant resistance to recoil forces. The firing arm may experience an increase in muscular tension given the necessity of applying rearward pressure from the pistol grip insofar to maintain steady hold of the rifle's buttstock in the shoulder pocket.

Fifthly, the placement of the shooter's cheek as pressed against the rifle's buttstock should remain rather firm and consistent from shot to shot, with the stock weld being observably correct when the cheek bone comfortably rests alongside and against the buttstock.

Sixthly, one must maintain controlled breathing while engaged in the act of shooting, as breathing causes unwanted movement of the chest and corresponding movement of the rifle and its associated sight, consequently loosing proper aim of the rifle.

Finally, the ability to minimize muscular tension and maximize muscular relaxation is paramount to the fundamentals of marksmanship. Muscular tension can be minimized as mentioned earlier by supporting the rifle with bone structure rather than by muscles given the latter being prone to becoming fatigued within a short timeframe, whereas muscular relaxation is facilitated by controlled breathing techniques.

Although conceptually understood, the extent by which one can satisfactorily adhere and effectuate the above fundamentals of marksmanship to become an accurate and precise shooter may be significantly hampered by the environmental setting of the engagement, state of readiness to react to impending threats, equipment one must don during adversarial engagements or competitive shooting events, and strength and physical attributes of the shooter.

It is generally understood that one's shooting proficiency may perceptually increase if one were to practice shooting repeatedly at a stationary target of known distance, from a standing position, and in a condition of perfect weather and no wind. However, that is not necessarily the case for most field training exercises leading to mastery of the fundamentals of marksmanship, particularly those that will foreseeably participate in combative and adversarial engagements. As with most engagements of this sort, the shooter may be required to establish a level of preparedness and assume certain body movements to advance positioning of the rifle for steady hold thereof before taking aim at the target, generally at moment's notice. Body movements may significantly vary and often depend on the immediacy of the engagement and distance to the target. The shooter's body movements may consist of a number of recognized positions that provide for presentation and steady hold of the rifle, such as assuming a prone position that provides for a very steady foundation for shooting and low profile for maximum concealment, but is considered the least mobile of firing positions, sitting position that provides for greater elevation than that of the prone position, while still having a fairly low profile, kneeling position that can be readily assumed at moment's notice and provides for easy maneuvering, and finally a standing position that is the quickest of positions to assume and offers maneuverability and mobility, thus being often used for most adversarial engagements.

As in the case of most active adversarial engagements, the shooter must don protective tactical gear that can further hinder adherence to the fundamentals of marksmanship. For example, it's commonly understood within the tactical forces of the military and law enforcement that one may be outfitted with a hard body armor vest composed of one or more internal protective plates, generally made from steel or ceramic, that can substantially add bulk and weight to oneself, thus unduly disrupting one's ability to assume certain body positions and quickly maneuver the rifle into position for accurate aim, all occurring within a matter of seconds.

Also, it is generally understood that a shooter's capabilities to maintain continued and repeated effort of taking aim and firing the weapon often depends on one's own inherent strength and resistance to overcome muscular fatigue over a set period of time, perhaps over a course of hours. The weight of the weapon in its own capacity is heavy and often unbalanced, thus necessitating exertion of muscular effort and control, and becomes even more problematic when having to raise, mount and hold the weapon against one's shoulder socket for an extended period of time. Further, it is often the case when firing weapons in the form of long guns, for example, there is an inherent tendency for the weapon to torque upwards and backwards relatively about one's hold of the stock, thus equally requiring a level of muscular strength to maintain continued control of the weapon, and if in the instance of failed muscular control, the shooter may not possess the requisite capability to relax the firing hand to fulfill precise trigger control over the weapon.

In efforts to advance general fulfillment of the fundamentals of precision marksmanship as denoted above, the art offers a range of simplistic and sometimes complex devices that perhaps would allow one to reduce the timeframe for assuming certain body positions and presenting the rifle and maintaining stable hold thereof for accurate and precise shots, particularly those being directed at long-range targets. The most simplistic of devices is one commonly employed for use within the armed forces and perhaps law enforcement, such as varied configurable forms of a sling or strap fabricated from textile webbing.

One known type is a three-point tactical sling that advances steady hold of the rifle while assuming any one of the denoted shooting positions, but is mainly limited for use in training exercises given its cumbersome configuration on the wearer. Comparatively, a web sling, which can be configurable as either a loop sling or a parade sling, allows for controlled carry and transport of the rifle and yet advances adherence to the fundamentals of marksmanship, notably as a supportive device for reducing muscular fatigue, developing and maintaining pressure of the rifle's buttstock against the shoulder socket, and providing limited stability of the rifle while firing rounds. Although variations of the sling are useful for their intended purpose, as denoted above, in addition to being rather inexpensive for widespread use, there are recognizable operative deficiencies in regard to the ability to execute the rifle's full range of motion, particularly relating to the extent of lateral and vertical travel upon assuming any one of the shooting positions. Further, slings in general offer no mechanical advantage in terms of promoting a balanced feel as the weapon's weight tends to be centralized more forward, can disengage from their wearable positions during field exercises and shooting rounds, and are prone to entangling with physical obstructions likely to be encountered in the field.

In a more sophisticated form of a device for supporting a rifle that may assistively advance the fundamentals of precision marksmanship to the likes of the sling, U.S. Pat. No. 8,215,045 issued to Mitchell describes a rifle buttstock aiming and stabilization device including in part a locator ball fitted with a stud that threadably attaches to a lowermost position of a buttstock end plate of the rifle and a socket assembly that is strap-mounted to the user's vest or jacket in proximity to the shoulder area. The socket assembly is further described as including an oblong horizontally-disposed socket integrally connecting to a lower approach ramp, where in its operative capacity, the locator ball slides up the accessible approach ramp and into the oblong socket as the user brings his/her weapon to a firing position. Although the device in Mitchell may be advantageous in certain respects, such as steading a rifle while in a more erect standing or kneeling position rather than that of the prone position, there are number of recognizable deficiencies associated with its use, particularly in instances of adversarial engagements. For example, the device in Mitchell requires the user to attentively locate and retain positioning of the locator ball within the socket for it to operate effectively, perhaps by means of ancillary usage of a sling attached to the rifle or by way of maintaining rearward pressure on the pistol grip, and if constant pressure is absent in any instance, the buttstock may unexpectedly disengage from the socket, conceivably more so in instances of rifle recoil. Furthermore, the ability to fully cant the rifle as much as 90 degrees left or right is rather limited due to the structure of the walls forming the socket that can unduly interfere with the rifle's buttstock, thus presenting a unsettling challenge to take proper aim at lateral-moving targets. Equally, moving the rifle upward to a near vertical position may be challenging given the probable tendency for the locator ball to slidably move outward from the socket and down the ramp in instances of taking aim at upward vertical targets. Other deficiencies of note include the inability to use the rifle apart from the socket assembly given the semi-fixed presence of the locator ball on the rifle's buttstock, the probable likelihood for the user not being readily capable of placing the locator ball within the socket and establish stabilization of the rifle at moment's notice, lack of appreciable mechanical advantage, and the inability of the user to facilitate taking aim and shooting at the target with one arm due to the location of the attached locator ball on the buttstock that effectively alters the lever and balance points of the rifle, in addition to the requirement of maintaining constant rearward pressure of the locator ball within the socket placed near or at the user's shoulder.

Although select mention of the foregoing devices may satisfy in part aspects of the fundamentals of marksmanship, they fail to comprehensively solve a significant number of the requirements that are paramount in maintaining steady hold of the rifle and taking aim at the target, notably those at long range and under the most pressing of circumstances likely to be encountered in adversarial engagements as well as in competitive events. Accordingly, there is a need for a device that readily and reliably attaches and detaches from the user's rifle at moment's notice, maintains use of the rifle apart from any form of a strap-mounted socket as in Mitchell, facilitates hands-free, secure hold of the rifle about the user while in a stand-down position, and provides for a full range of lateral and vertical movements of the rifle with predictable and dependable engagement of the rifle's buttstock positionally with the user's shoulder.

BRIEF SUMMARY OF THE INVENTION

In order to overcome the numerous drawbacks apparent in the prior art, a weapon stabilization device has been devised for readily attaching to and detaching from a long gun or rifle of the type generally administrated to and used by the tactical forces of the military and law enforcement, professional shooters, and recreational enthusiast.

It is an object of the present invention to provide a weapon stabilization device that offers a secure anchor point at and near the user's shoulder, thus allowing for quicker allocation and consistent sight pictures while actively engaging in firing rounds of ammunition.

It is an object of the present invention to provide a weapon stabilization device that creates a mechanical leverage point at and near the shoulder area, thus making the weapon feel lighter and more actionable and relaxing the trigger hand, particularly being advantageous in instances of taking aim at moving targets at moment's notice It is yet another object of the present invention to provide a weapon stabilization device that effectively allows the user to maintain a sight picture consistently from any one of the standing, sitting, kneeling, or prone shooting positions, with little to no adjustment needed when altering or modifying the position from time to time.

It is a further object of the present invention to provide a weapon stabilization device that fundamentally establishes a hinge and lever system due to semi-permanent mounting of the weapon against the shoulder socket area, thus providing a mechanical advantage for taking precise and accurate aim and firing of the weapon with minimal muscular effort, particularly being advantageous for shooters possessing insufficient muscular mass and strength due to impairment, injury, illness and so forth.

It is an object of the present invention to provide a weapon stabilization device that operates conjunctively with a rifle without pronounced structural alteration of its intended design characteristics.

It is an object of the present invention to provide a weapon stabilization device that affords versatility in connecting to straps and like structures often associated with tactical gear, protective vests, backpacks, and so forth.

It is yet another object of the present invention to provide a weapon stabilization device that fulfills an expanded range of motion, both vertically and laterally, while equally allowing for cant of the rifle upwards of 90 degrees at any one position within the applicable range of motion.

It is a further object of the present invention to provide a weapon stabilization device that fulfills hands-free, secure hold of the rifle to effectuate safe carry and transport thereof, generally in instances of assuming a stand-down position.

It is yet another object of the present invention to provide a weapon stabilization device that affords one-hand, safe operation of the rifle, such as to facilitate multitasking events in the field.

It is a further object of the present invention to provide a weapon stabilization device that provides for lineal adjustment of the rifle's effective length to accommodate a user's individual preferences.

It is a further object of the present invention to provide a weapon stabilization device that accommodates a range of diametric sizes of buffer tubes generally associated with a rifle's stock configuration.

In accordance with the present invention, a weapon stabilization device has been devised for attachment to a weapon in the form of a long gun or rifle without unduly compromising its structural integrity and operating characteristics, the device principally includes a stock chassis configured with an elongate body for housing and supporting a buffer tube connecting to and extending from the weapon, an angular frame member integrally connecting to and extending angularly inward from a heel end of the elongate body for attaching thereto a butt pad and housing a lock release assembly for mechanically disengaging a lockable mechanism directed to semi-permanently connecting the stock chassis to a shoulder chassis, and a V-shaped brace configured with a first support attached to the angular frame member and a second support attached to the elongate body, the stock chassis further includes a pin-lock release assembly slidably mounted and affixed to a mounting rail integral to the elongate body with the pin-lock release assembly having a pin pull plate operably connecting to an adjustable pin for engaging and disengaging the buffer tube within the elongate body to establish a distantial relation between the stock chassis and weapon, the shoulder chassis includes a curvilinear shoulder plate for resting against and engaging a shooter's shoulder socket or chest area and having multiple elongate apertures for accepting therethrough connective straps for encircling and tightly engaging an ancillary strap generally associated with a vest, backpack and jacket as well as connectively linking the shoulder chassis to a strap anchor and a barreled section having an interior chamber for housing therein a primary rotational element of a dual-ball joint assembly, the strap anchor includes a unitive plate configured with an elongate locking bar and a receiver base with upper and lower channels for accepting in either one thereof the elongate locking bar after situating a selective portion of the ancillary strap respectively within upper or lower indentations, the dual-ball joint assembly further includes a secondary rotational element housed within the lockable mechanism and connectively linked to the primary rotational element by a connective bolt, the lockable mechanism includes five triangulated protuberances forming a star-shaped head for placement within a star-shaped receptacle integrated within an open-ended chamber of the heel end of the elongate body, whereby the dual-ball joint assembly permits the lockable mechanism of the shoulder chassis, as recognizably connected to the stock chassis, to traverse relatively about an exterior portion of an open-nosed end of the barreled section to primarily enable the attached weapon to move laterally leftward and rightward as well as vertically upward and downward relatively about the individual user.

BRIEF DESCRIPTION OF THE SEVERAL VIEWS OF THE DRAWINGS

A preferred embodiment of the present invention will now be described by way of example with reference to the accompanying drawings, in which.

DETAILED DESCRIPTION OF THE INVENTION

While this invention is susceptible of being embodied in many different forms, the preferred embodiment of the invention is illustrated in the accompanying drawings and described in detail hereinafter with the understanding that the present disclosure purposefully exemplifies the principles of the present invention and is not intended to unduly limit the invention to the embodiments illustrated and presented herein. The present invention has particular utility as a weapon stabilization device capable of being readily attached to and detached from a weapon in the form of a long gun or rifle without adversely impacting its inherent design, structure and operating characteristics.

Figure 1:
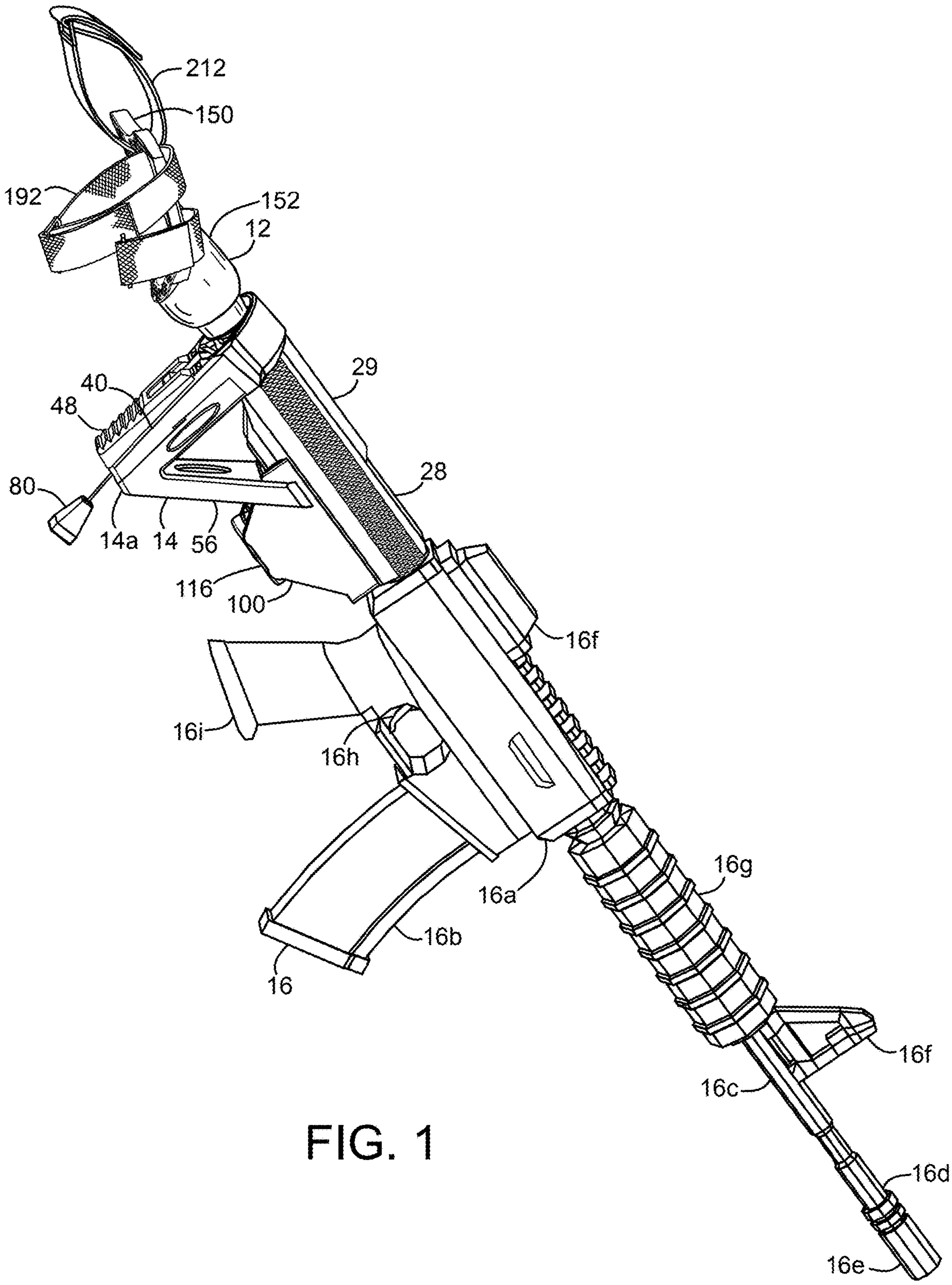
FIG. 1 is a side perspective view of a stock chassis and a shoulder chassis of a weapon stabilization device connecting to a weapon in the form of a long gun by way of a buffer tube of conventional form.
Figure 2:
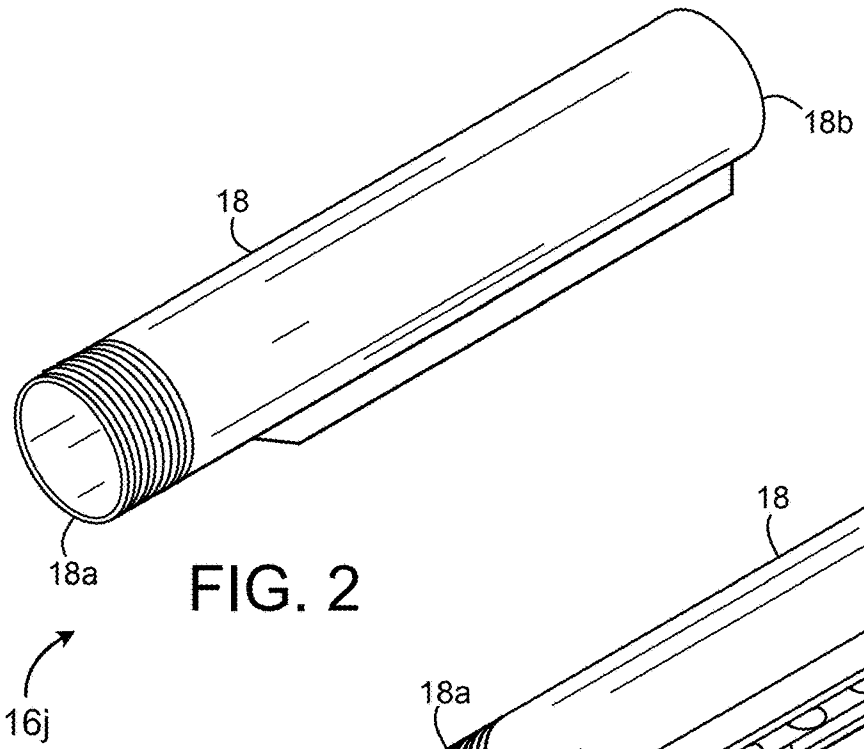
FIG. 2 is a top perspective view of a buffer tube of conventional form and available in the art.
Figure 3:
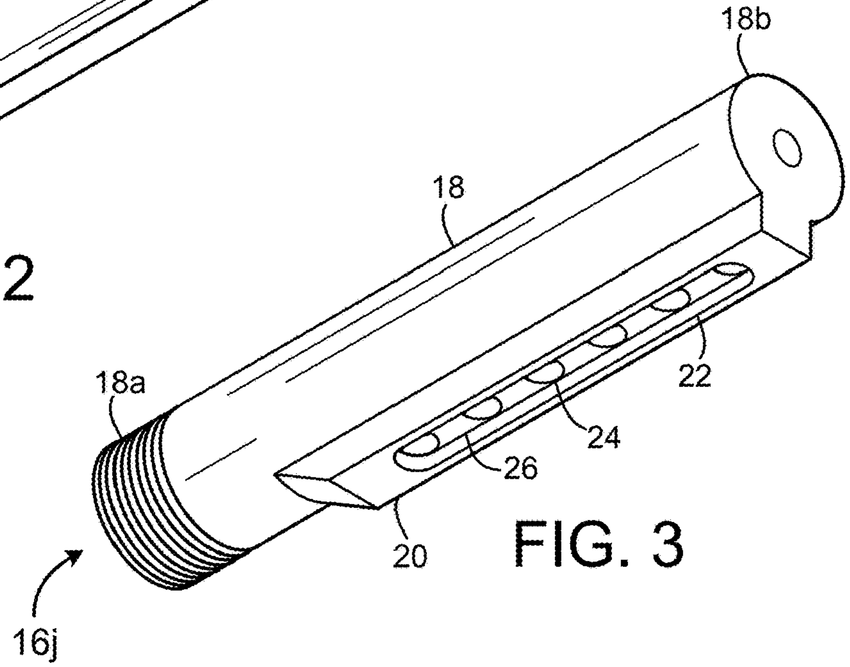
FIG. 3 is a bottom perspective view of a buffer tube of conventional form and available in the art and having a cylindrical body configured with an integral bottom rail.
Figure 4:
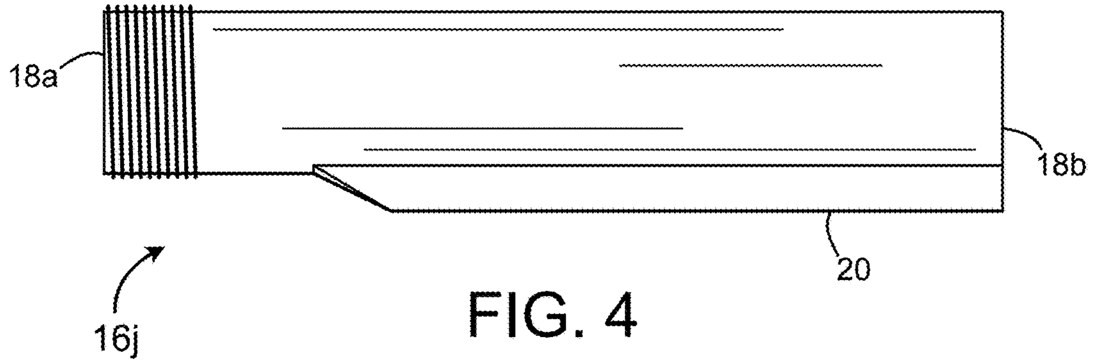
FIG. 4 is a side elevational view of a buffer tube of conventional form and available in the art.
Figure 5:
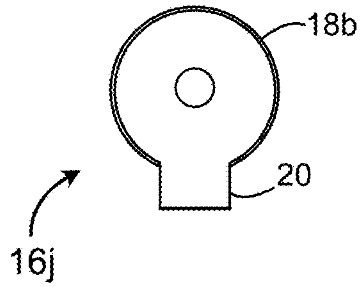
FIG. 5 is a left elevational view of a buffer tube of conventional form and available in the art.

Now referring to FIG. 1, a weapon stabilization device 10 is shown therein as having a shoulder chassis 12 connecting to a stock chassis 14 collectively suited for attaching to and operating alongside a weapon 16 generally of the type commonly known in the art and available for use by military personnel, law enforcement, recreational enthusiast, and competitive shooters. The weapon for purposes of application and description may characteristically include a receiver (upper and lower) 16*a*, a magazine 16*b* for storage of unspent ammunition, a barrel 16*c* connecting to and openly communicating with the receiver and having its tipped end 16*d* fitted with a muzzle 16*e*, rearward and forward sights 16*f* mounted to and situated above the receiver and barrel, a handguard 16*g* engagingly fitting over a portion of the barrel, a trigger mechanism 16*h* with a guard situated in between a pistol grip 16*i* and the magazine, below the upper receiver, and a buffer tube 16*j* adjustably connecting to a stock assembly (not shown) equipped with a butt plate or pad that positionally rests against and engages a user's shoulder or chest. It is generally understood within the context of this disclosure that the stock chassis 14 of the weapon stabilization device 10 aptly replaces the prior art stock assembly and utilizes the buffer tube typically associated with the type of conventional weapon described herein.

FIGS. 2-5 depict the construct of the buffer tube 16*j*, which can be generally described as including a cylindrical body 18 of hollow construction for a housing therein a spring and guide assembly (not shown) and having a threaded end 18*a* threadably mounted to the receiver 16*a* of the weapon and a port-hole end 18*b* connectively fitting interiorly within the stock assembly of the conventional weapon described herein or, in the instance of the weapon stabilization device 10, to the stock chassis. The cylindrical body in most instances will include an integral bottom rail 20 of a predetermined length extending longitudinally therewith and having an elongate depression 22 configured with a plurality of notches 24 spaced evenly about an exposed bottom surface 26 thereof, wherein the individual notches assistively serve to adjust the weapon 16 relatively to the prior art stock assembly or stock chassis 14 of the present invention.

Figure 6:
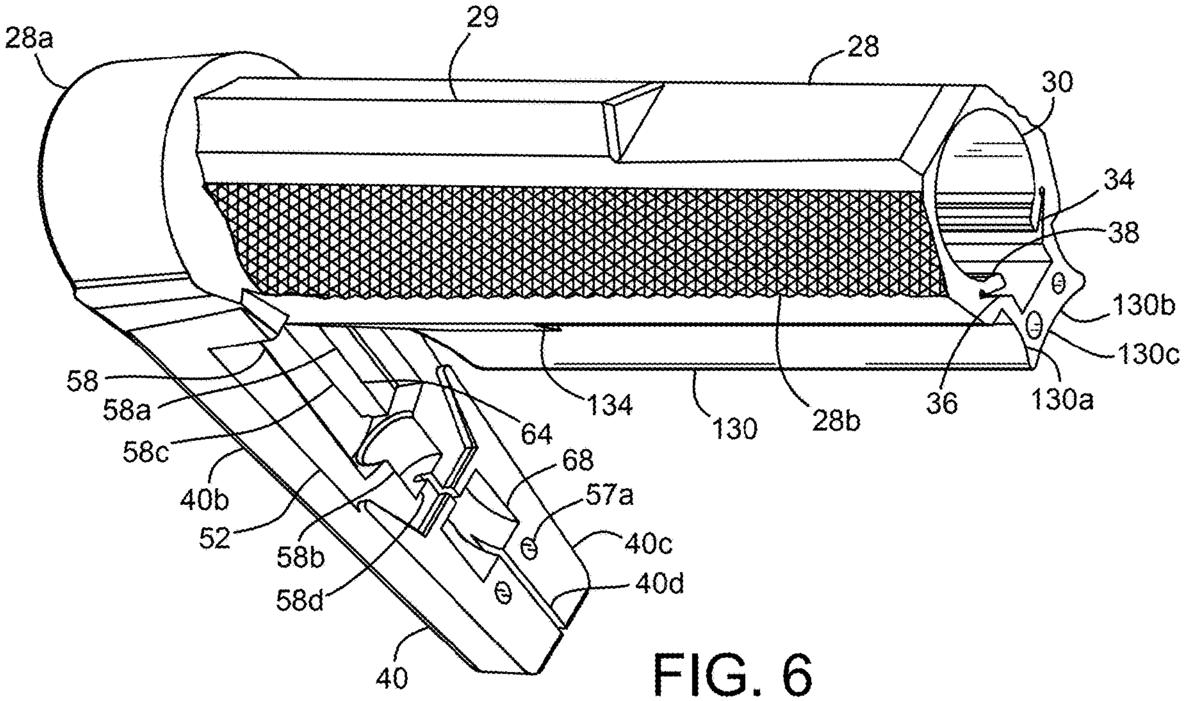
FIG. 6 is a top perspective view of a stock chassis having an elongate body integrally connecting to an angular frame member configured with primary and secondary reliefs.

In reference to FIGS. 6-9, the stock chassis is shown therein as having an elongate body 28 configured with an upper sight 29 of elongate triangulated form positioned atop thereof and a throughput bore 30 extending lengthwise therewith, with the throughput bore having a channel 32 in open communication therewith to collectively form an overall shape generally coinciding with the overall exterior configuration of the buffer tube 16*j*. In order to accommodate varying diametric sizes of buffer tubes known and available in the art, an interior sidewall 30*a* of the throughput bore 30 integrally includes a pair of linear flanges 34 primarily formed by a conforming cutout 36 of the sidewall that in essence allows the flanges to flex radially inward or outward a predetermined amount within the geometric spatial confines of the throughput bore as the buffer tube is slidably placed into and removed from a user-select position. The extent of radial movement of the flanges is primarily determined by the presence a convex-shaped bump 38 running lengthwise about the individual flanges and its height or apex extending upwardly into the geometric spatial confines of the throughput bore 30, as generally illustrated in FIG. 6.

Figure 7:
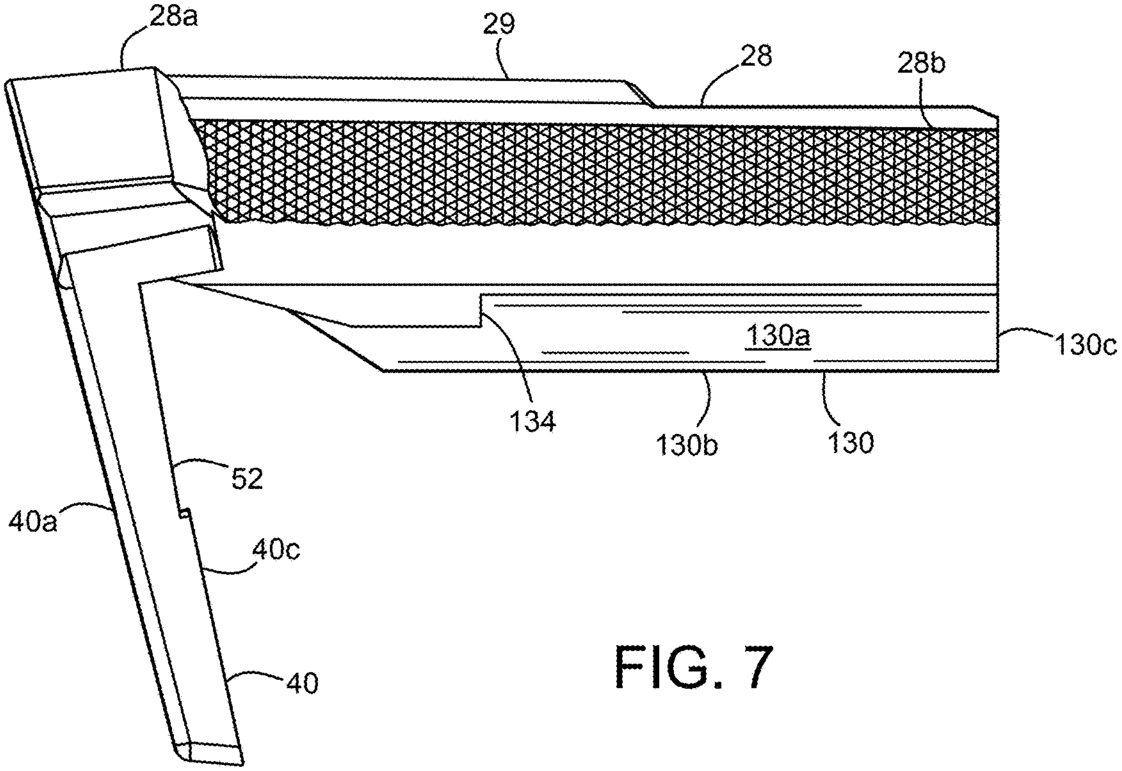
FIG. 7 is a front elevational view of a stock chassis having an elongate body integrally connecting to an angular frame member.
Figure 8:
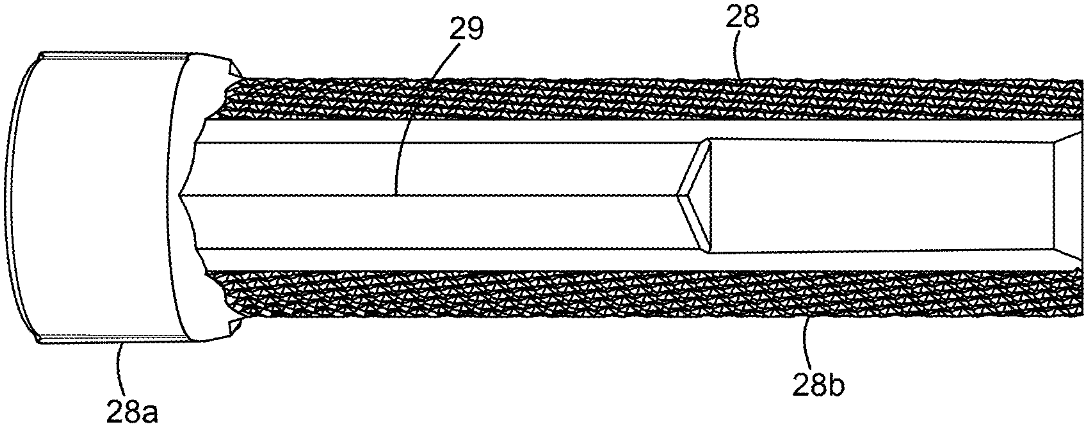
FIG. 8 is a top plan view of a stock chassis having an elongate body with an upper sight.
Figure 9:
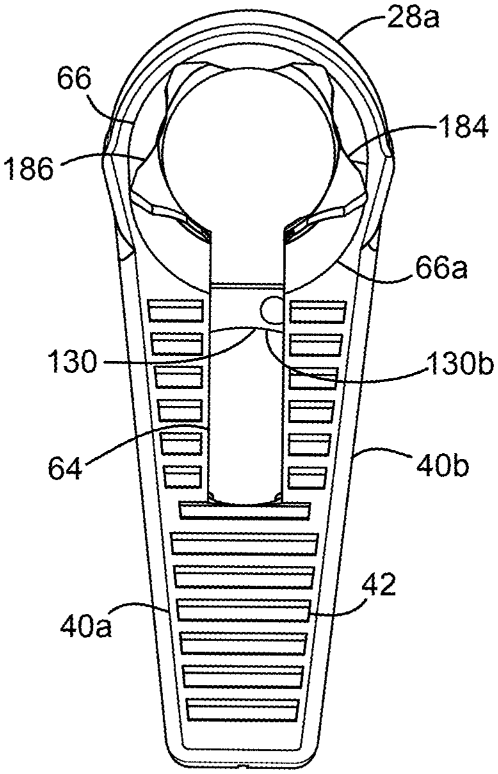
FIG. 9 is a left elevational view of a stock chassis having an angular frame member configured with an elongate open slot and a plurality of V-shaped depressions.

In further association with the structure of the stock chassis 14, an angular frame member 40 is shown in FIGS. 6 and 7 as integrally connecting to a heel end 28*a* of the elongate body and angularly extending inward below the elongate body a predetermined amount, particularly as such to improve upon the use of the rearward and forward sights 16*f* associated with the weapon 16 and facilitate movement of the weapon from a 90-degree cant to an upright or vertical shooting position, in addition to preventing a lower part of the stock chassis from making inadvertent contact with the user's body. The angular frame member 40 in particular is shown in FIG. 9 as having an outward face 40*a* configured with a plurality of V-shaped depressions 42 situated in between exterior edges 40*b* of the angular frame member to engagingly mate with and fixedly attach to raised members 44 integral to a mountable surface 46 of a butt pad 48, with each of the raised members having a geometric configuration substantially equivalent to each of the V-shaped depressions. In this regard, the corresponding arrangement of V-shaped depressions and raised members, as well as the presence of a pair of curved sidewalls 50 of the butt pad, as in FIGS. 10-12, fulfill the ability to readily place and accurately position the butt pad relatively to the stock chassis 14 for securement with adhesive or equivalent connective means. Opposing the outward face, the angular frame member 40 includes an inward face 40*c* generally depicted in FIG. 6 as being configured with a primary relief 52 for accommodating therein a raised portion 54 associated with a first support 56*a* of a V-shaped brace 56 that in essence serves to correctly orientate the position of the V-shaped brace relatively to the angular frame member before connection thereto by screws 57 threadably fitting with an aligned arrangement of bores 57*a* extending through the V-shaped brace and into the inward face. A secondary relief 58, as centrally contained within the confines of the primary relief 52, is shown in FIG. 6 as having an interior surface 58*a* and an integrated semi-cylindrical notch 58*b* in open communication therewith to structurally house in part a lock release assembly 60 primarily directed to unlocking and releasing a lockable mechanism 62 operating in conjunction with the shoulder chassis 12. As in FIGS. 6 and 9, the angular frame member 40 is further supplemented with an elongate open slot 64 observably within the confines of the primary and secondary reliefs 52, 58 and extending lengthwise into an open-ended chamber 66 integrated within the heel end 28*a* of the elongate body, configurably in open communication with the throughput bore 30. A curvilinear inset 68, as existing below and in proximity to the integrated semi-cylindrical notch, accepts and houses therein a cable guide 70 with a shape substantially corresponding to the geometric configuration of the curvilinear inset depicted in FIG. 6, with the cable guide being structurally supplemented with a slot 70*a*.

Figure 10:
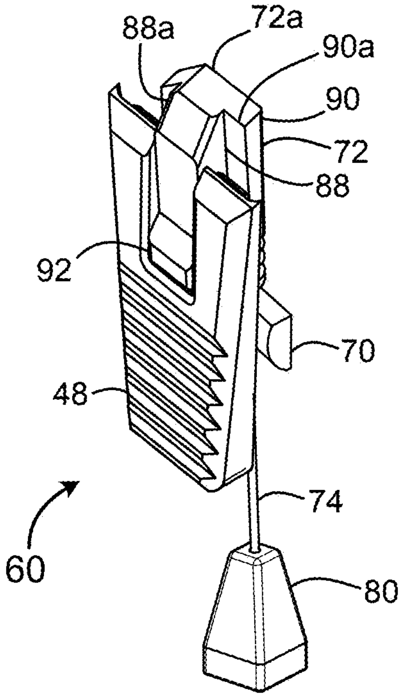
FIG. 10 is a top perspective view of a lock release assembly configured with a butt pad and a slider plate connecting to a cable pull.
Figure 11:
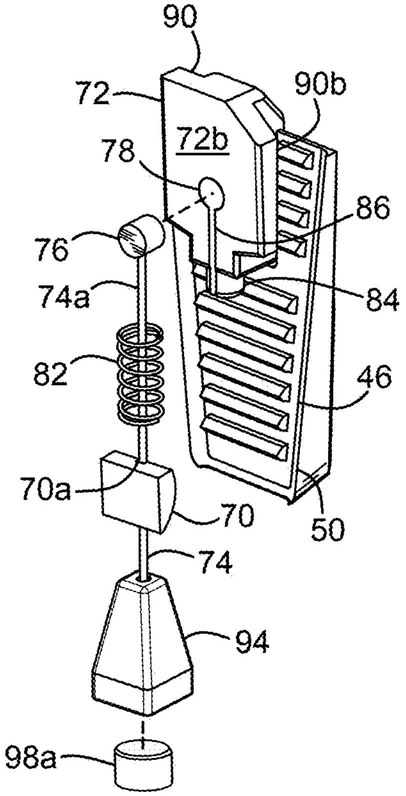
FIG. 11 is a back perspective view of a lock release assembly configured with a cable pull and handle assembly shown apart from a slider plate and a butt pad.
Figure 12:
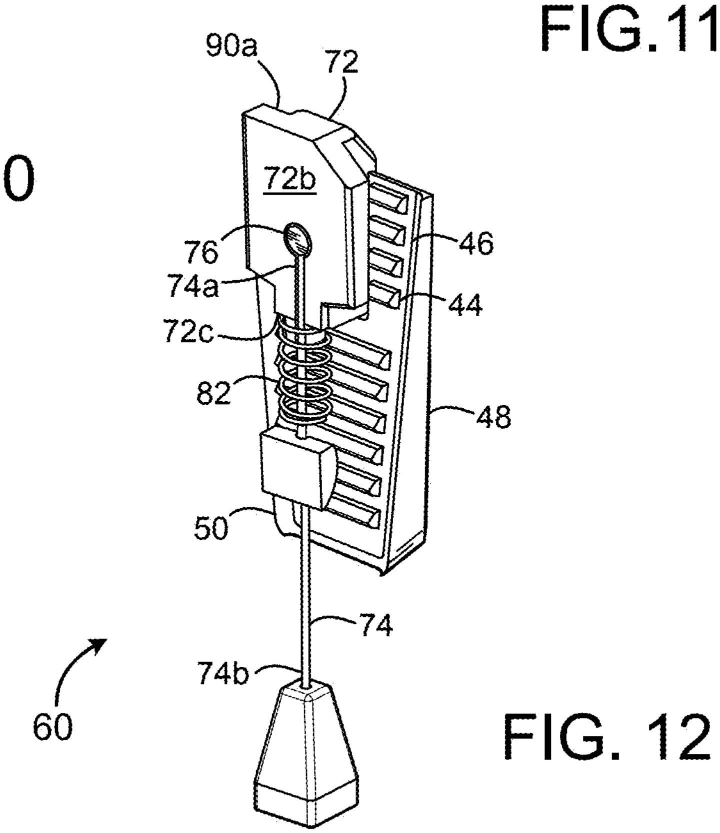
FIG. 12 is a back perspective view of a lock release assembly configured with a butt pad and a slider plate being fitted with a spring and connecting to a cable pull and a handle assembly.

The lock release assembly 60, as shown apart from the stock chassis 14 in FIGS. 10-12, can be summarily described as including a slider plate 72 configured with an upper portion 72*a* extending partway into the open-ended chamber 66 for operably interacting with the lockable mechanism 62, a cable pull 74 having one end 74*a* fixedly attached to a securement block 76 for fitment within an equally configured depression 78 extending into an inward side 72*b* of the slider plate and a second end 74*b* fitted with a handle assembly 80, and a spring 82 engagingly fitting onto a cylindrical support 84 extending downwardly from a bottom face 72*c* of the slider plate 72, substantially existing in an opposing relation to the upper portion 72*a*. An extending channel 86 of the type shown in FIG. 12 is integrated within the structure of the slider plate and primarily extends from the equally configured depression 78 of the inward side 72*b* and continues to extend the length of the cylindrical support to accommodate and slidably accept therein a portion of the cable pull 74. In further respects, the slider plate 72 is illustrated in FIG. 10 as including a raised portion 88 situated in between a pair of sideward flanges 90 each having a length approximating the length of the slider plate, wherein the raised portion configurably fits within the spatial confines of the elongate open slot 64 to operate primarily as a mechanical handle 92 for manipulating movement of the lock release mechanism 60 from time to time. The raised portion 88, as in FIG. 10, is further supplemented with a chamfered-corner 88*a* at the upper portion to geometrically conform to a beveled entryway 66*a* of the open-ended chamber 66 such to facilitate ease by which the lockable mechanism 62 of the shoulder chassis 12 can be slidably placed therein.

Figure 13:
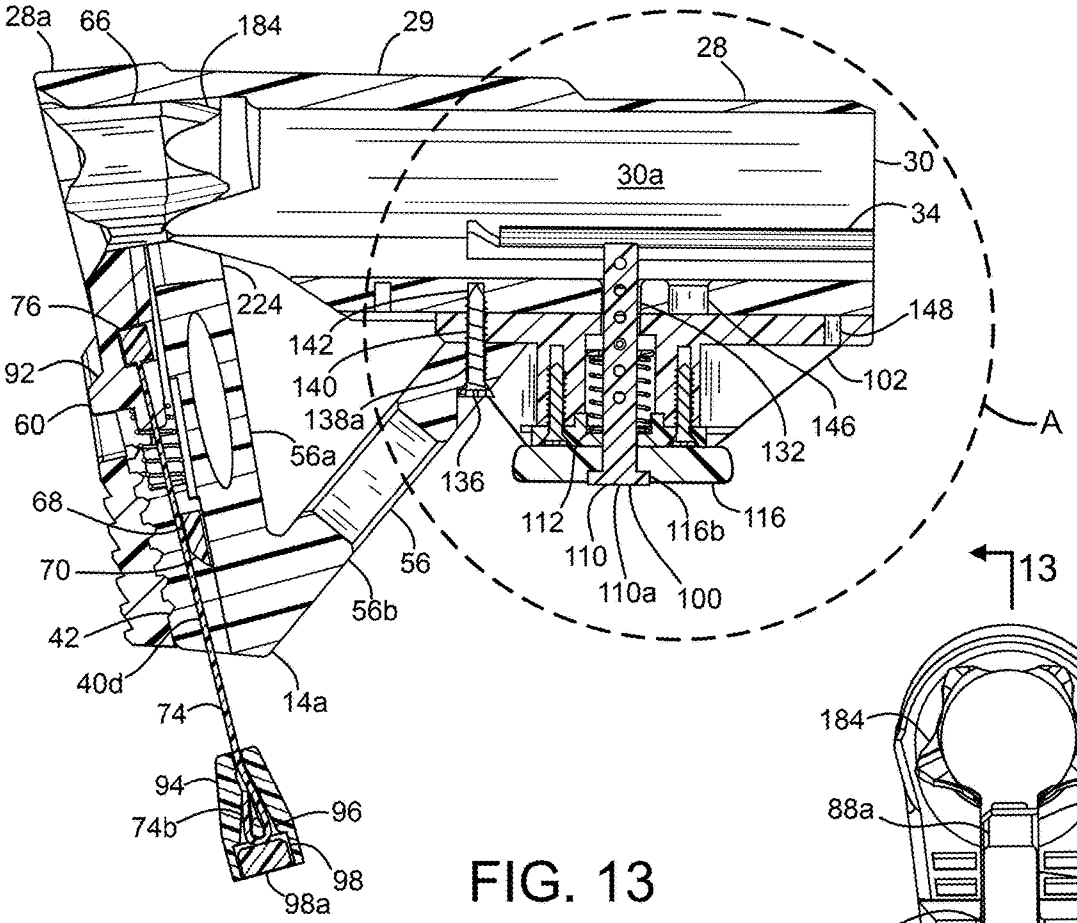
FIG. 13 is a cross sectional view of a stock chassis taken along line 13-13 in FIG. 14 illustrating an elongate body integrally connecting to an angular frame member configured with a cable pull connecting to and extending from a slider plate and a pin-lock release assembly connecting to and extending below the elongate body.
Figure 18:
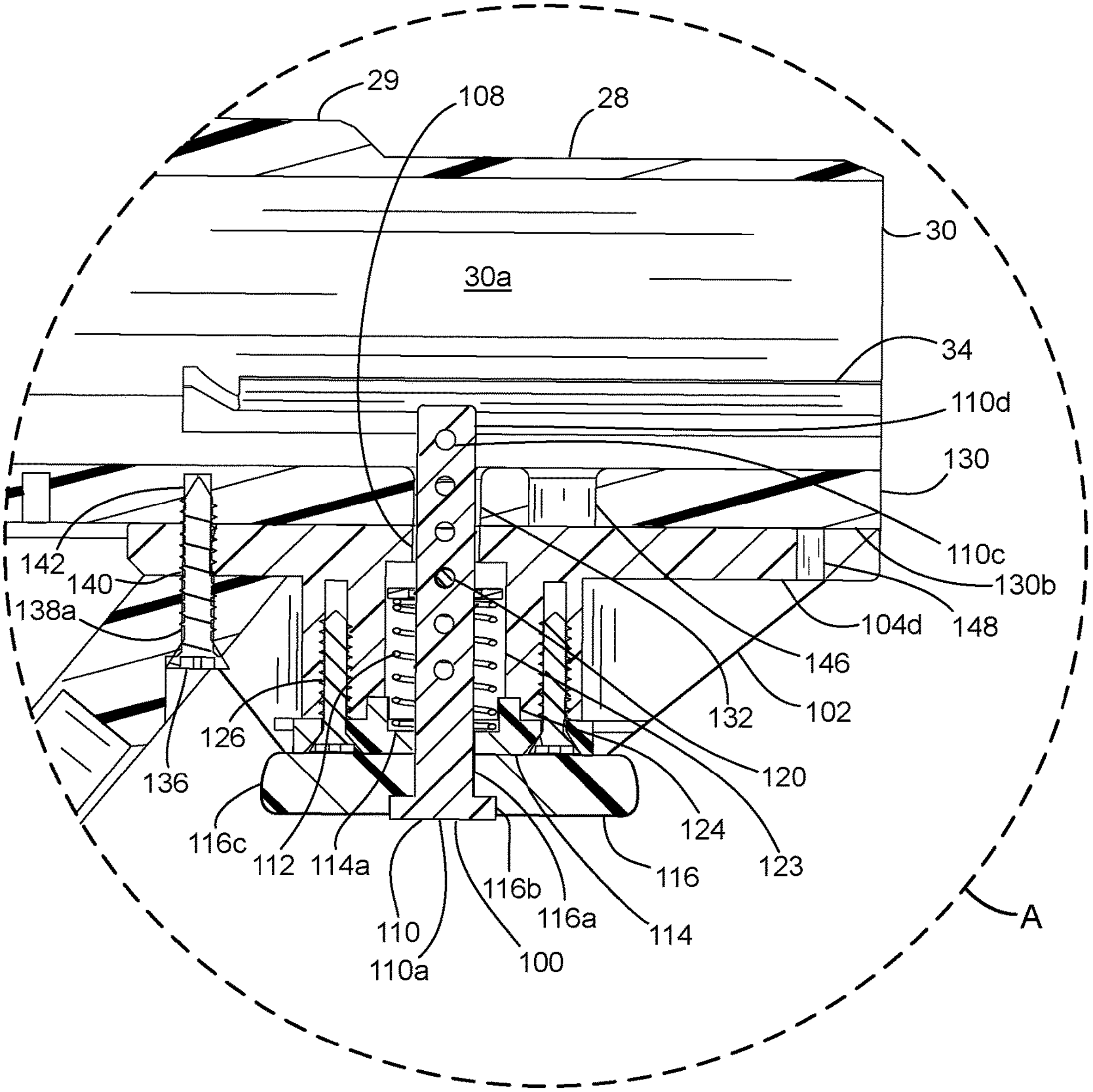
FIG. 18 is a partial enlarged side elevational view of a stock chassis depicted in FIG. 13.
Figure 19:
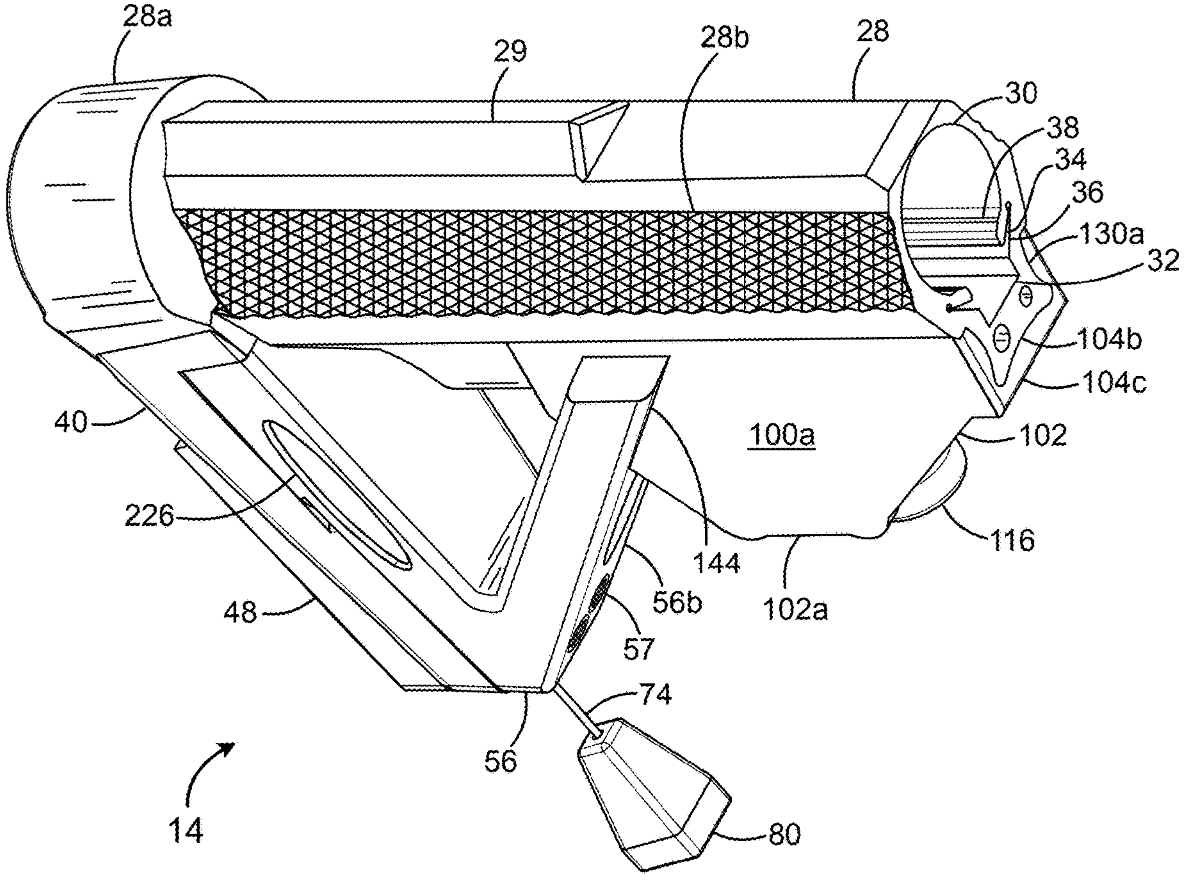
FIG. 19 is a top perspective view of a stock chassis having an elongate body configured with a throughput bore incorporating a pair of linear flanges, a pin-lock release assembly mounted below the elongate body, and a V-shaped brace connected to a pin housing and an angular frame member.
Figure 20:
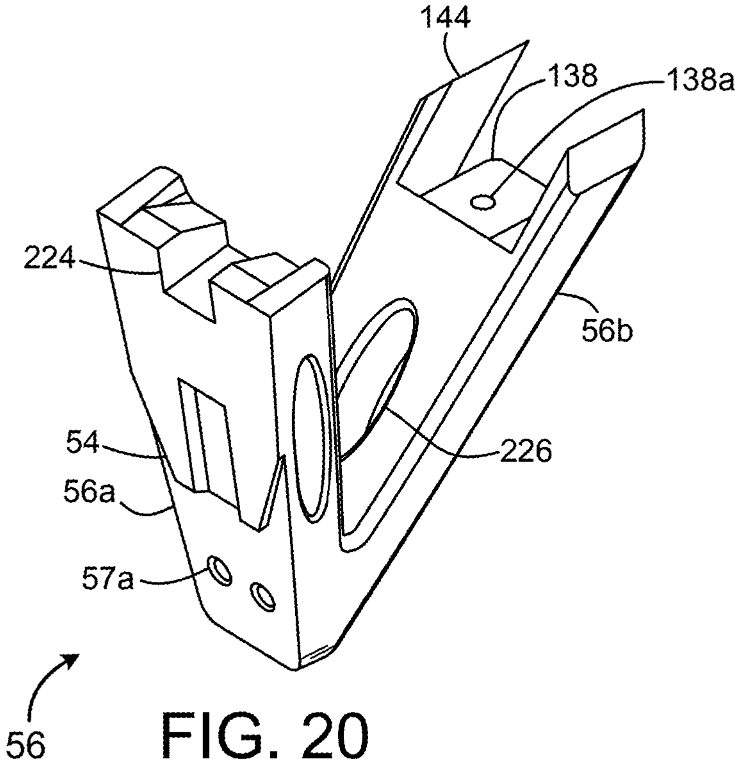
FIG. 20 is a top perspective view of a V-shaped brace configured with first and second supports respectively having a raised portion and a mount platform.
Figure 21:
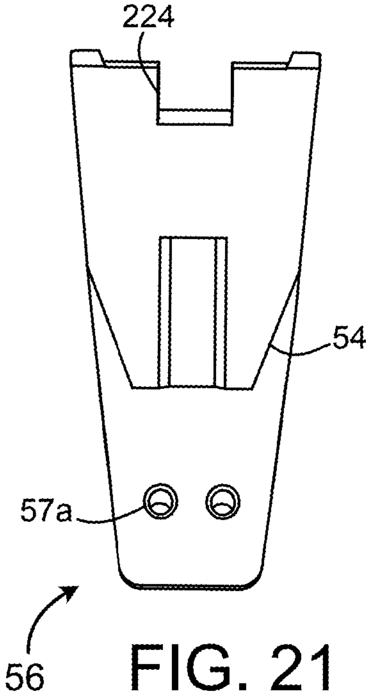
FIG. 21 is a left elevational view of a V-shaped brace configured with a first support having a raised portion.
Figure 22:
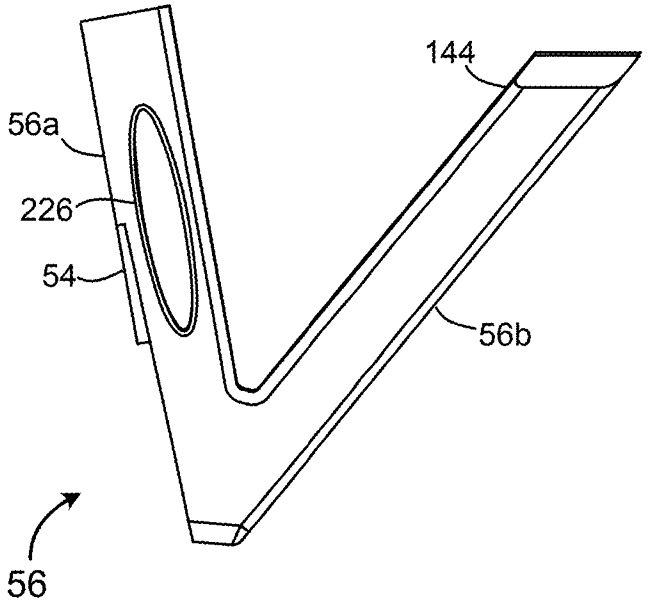
FIG. 22 is a front elevational view of a V-shaped brace configured with first and second supports.
Figure 23:
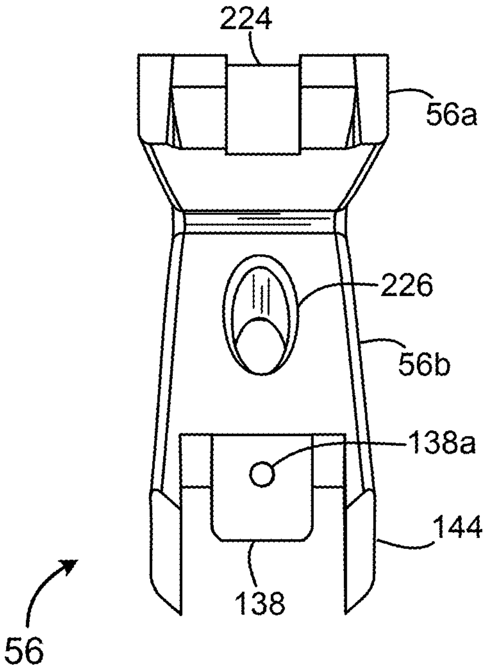
FIG. 23 is a top plan view of a V-shaped brace configured with first and second supports each respectively having a mount platform and a pass-through notch.

In assembled form of the lock release mechanism 60 within the stock chassis 14 as depicted in FIGS. 18 and 19, outward faces 90*a* and outer sidewalls 90*b* of the sideward flanges 90 are aptly positioned to respectively engage the interior surface 58*a* and inner sidewalls 58*c* of the secondary relief 58, with the spring 82 being fitted to the cylindrical support 84 and positionally extending into the integrated semi-cylindrical notch 58*b* and terminating at its base 58*d*. Further, FIG. 13 illustrates routing of the cable pull 74 as generally extending from its positional presence within the extending channel 86 of the slider plate and passing into and through a slot 40*d* integrated within the inward face 40*c* of the angular frame member 40 as well as the slot 70*a* of the cable guide 70 appropriately aligned therewith, an arrangement of which aptly situates the handle assembly 80 about a lower part 14*a* of the stock chassis for convenient access thereto during decisive moments of separating the stock chassis 14 from the shoulder chassis 12. FIG. 13 shows generally the construct of the handle assembly, which includes a pull housing 94 configured with an inner curved pathway 96 in open communication with a cylindrical recess 98 for receiving and fitting therein a plug 98*a* of equal geometric proportions. Prior to fitting the plug within the cylindrical recess, the second end 74*b* of the cable pull, preferably in a non-splayed condition, is fed interiorly within the inner curved pathway, after which time, glue, adhesive, or equivalent is placed within the cylindrical recess and to the extent possible, within the inner curved pathway, followed by fitment of the plug to consummate a secure connection of the cable pull 74 with that of the handle assembly 80.

Figure 15:
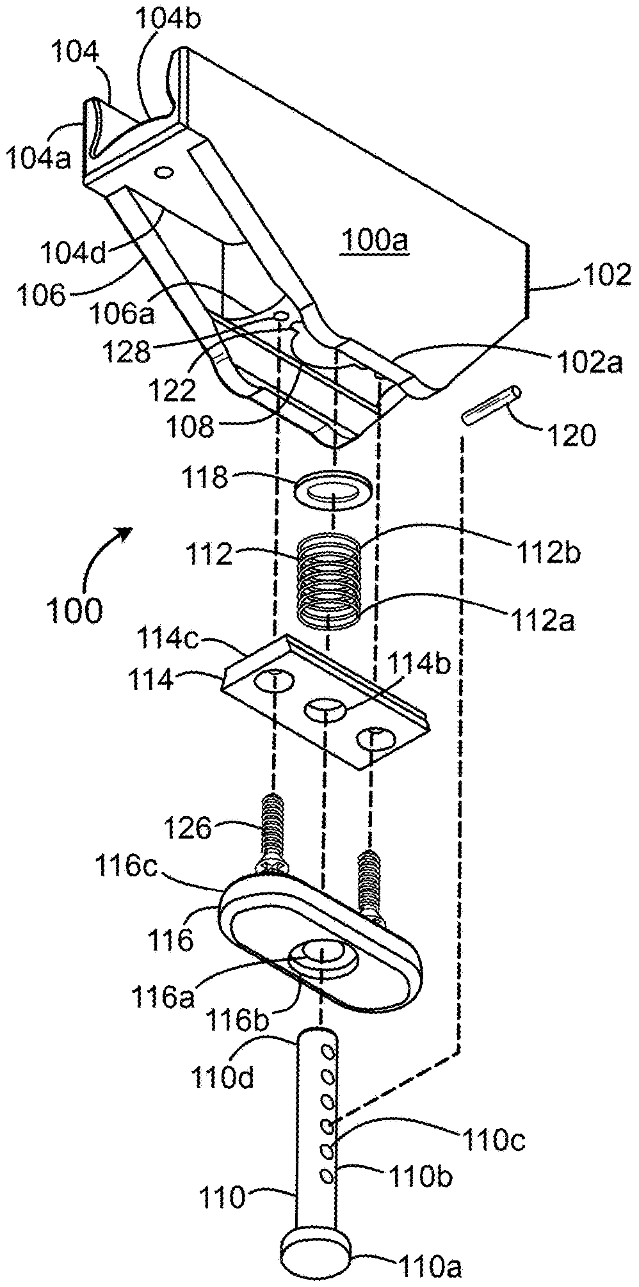
FIG. 15 is an exploded perspective view of a pin-lock release assembly configured with a pin housing, an adjustable pin, a pin pull plate, a spring mount plate, and an internal spring.
Figure 16:
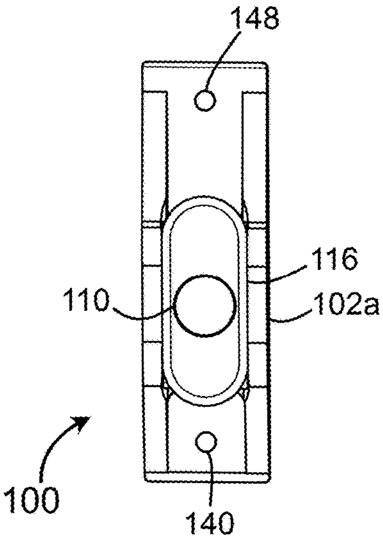
FIG. 16 is a bottom plan view of a pin-lock release assembly configured with a pin pull plate.
Figure 17:
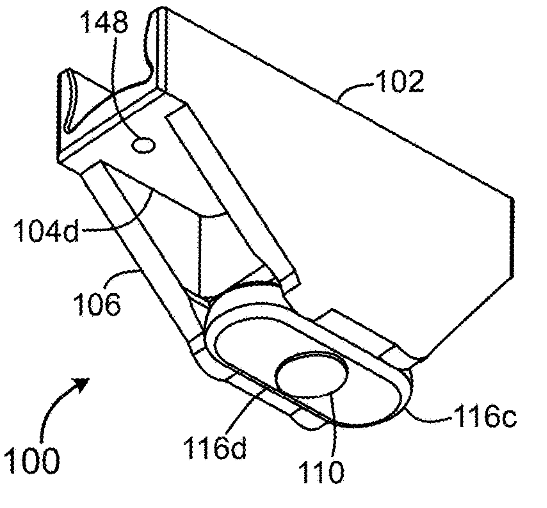
FIG. 17 is a bottom perspective view of a pin-lock release assembly configured with a pin housing fitted a pin pull plate.

Now in references to FIGS. 15-17, the stock chassis 14 is supplemented with a pin-lock release assembly 100 for securing the buffer tube 16*j* with respect to the stock chassis as well as offering capability for lineal adjustability of the stock chassis relatively to the weapon 16 and its associated trigger mechanism 16*h*. FIGS. 15-17 illustrate the pin-lock release assembly apart from the stock chassis to mainly comprise a pin housing 102 configured with a mounting channel 104 incorporating two sides 104*a* and a base 104*b* each with a convex profile, a lower body 106 extending downwardly from and integrally connecting to the base of the mounting channel and having a pin bore 108 substantially extending through and perpendicular to the base for slidably accepting therein an adjustable pin 110, an internal spring 112 slidably fitting about the adjustable pin with a first end 112*a* of the internal spring engaging a shallow depression 114*a* integral to a spring mount plate 114 and a second end 112*b* being affixed about a pre-select position along the adjustable pin, and a pin pull plate 116 loosely connecting to the adjustable pin.

In advancing initial assembly of the pin-lock release assembly 100, as in FIGS. 13 and 18, the adjustable pin 110 is slidably placed into and passes through an arranged set of apertures 114*b*, 116*a*, extending through the shallow depression and pin pull plate where it can freely rotate therewithin on an as-needed basis, with a head 110*a* of the adjustable pin being situated within a circular inset 116*b* of the pin pull plate. Thereafter, the internal spring 112 is fitted about a shaft portion 110*b* of the adjustable pin and held thereat by a washer 118 and a locking pin 120 slidably fitted into one of a series of cross bores 110*c* extending through the shaft portion to establish a desirable amount of pre-tensioning of the internal spring before collective assembly with the lower body 106. A pair of opposing notches 122 as in FIG. 15 exist integral to a spring bore 123 held concentric with the pin bore 108 and extend inwardly a predetermined amount from a bottom side 106*a* of the lower body to accept therein a pair of prongs 124 extending upwardly from a top surface 114*c* of the spring mount plate. A pair of screws 126 threadably fitting within bores 128 adjacent to the opposing notches 122 facilitate attachment of the spring mount plate 114 to the lower body. At this juncture, the shaft portion 110*b* of the adjustable pin 110 is concentrically seated within the pin bore 108 with the internal spring contemporaneously housed within the spring bore and pin pull plate loosely and engagingly situated atop of the spring mount plate 114, as generally depicted in FIG. 18.

After consummating initial assembly in this regard, with the pin pull plate 116 pulled downwardly away from the spring mount plate 114 consequentially compressing the internal spring 112 a relative amount such that a top end portion 110*d* of the adjustable pin becomes situated in proximity to the base 104*b* of the mounting channel, the mounting channel 104 of the pin-lock release assembly 100 is slidably positioned onto a mounting rail 130 integral to the elongate body 28 of the stock chassis 14, where in particular the mounting rail includes a pair of sides 130*a* and a bottom side 130*b* each having a concave profile substantially forming an overall geometric configuration capable of accommodating for purposes of fitment the convex-shaped sides 104*a* and base 104*b* of the mounting channel as in FIG. 19. FIGS. 13 and 18 exemplifies arrangement of the pin-lock release assembly 100 relatively to the elongate body 28, where in particular the top end portion 110*d* of the adjustable pin is shown as extending through a first bore 132 integrated within the bottom side 130*b* of the mounting rail and extending partway into the spatial confines of the throughput bore 30 to intercept and lockingly engage with one of the plurality of notches 24 associated with the buffer tube 16*j*. A stop 134 structurally integrated within the mounting rail as in FIG. 7, functioning to the likes of the top end portion 110*d* extending into the throughput bore, limits the extent by which the pin-lock release assembly 100 can travel relatively thereabout while allowing exposed ends 104*c*, 130*c* of the mounting channel and rail to primarily sit flush with one another to the likes depicted in FIG. 19.

FIG. 18 further illustrates aspects of supplemental connectivity of the pin-lock release assembly 100 with that of the elongate body, where a holding screw 136 is shown therein as passing into and through an aperture 138*a* extending through a mount platform 138 associated with a second support 56*b* of the V-shaped brace 56 and a primary bore 140 extending through the base 104*b* of the mounting channel 104 and threadably terminating within a shallow bore 142 extending into the bottom side 130*b* of the mounting rail 130. In furthering structural rigidity to the stock chassis 14, the second support 56*b* of the V-shaped brace, as shown in FIGS. 20-23, is further appointed with a pair of sideward projections 144 individually existing alongside and in proximity to each side 138*b* of the mount platform 138 such to extendably coincide with the angular orientation of the second support 56*b* and positionally engage with exterior sidewalls 100*a* of the pin housing 102 while the mount platform positionally engages a bottom side 104*d* of the mounting channel's base 104*b*.

As further observed in FIGS. 13 and 18, the pin-lock release assembly 100 possesses innate capability to alter the effective distantial relation of the stock chassis 14 from that of the weapon 16, besides the selective positioning of the top end portion 110*d* of the adjustable pin through the first bore 132 for engagement with one of the notches 24 associated with the buffer tube 16*j*. In particular, the pin-lock release assembly can be rotated 180 degrees such that the top end portion of the adjustable pin 110 is capable of slidably fitting within a second bore 146 extending through the bottom side 130*b* of the mounting rail 130, generally in proximity to the first bore but in closer relation to the exposed end 130*c* of the mounting rail. In this alternative arrangement, the methodology of attachment of the pin-lock release assembly 100 to the elongate body 28 of the stock chassis advances continued use of the holding screw 136 fitting within the aperture 138*a* and shallow bore 142 respectively existing within the mount platform 138 and mounting rail 130, but notably makes use of a secondary bore 148 extending through the base 104*b* of the mounting channel 104.

Figure 24:
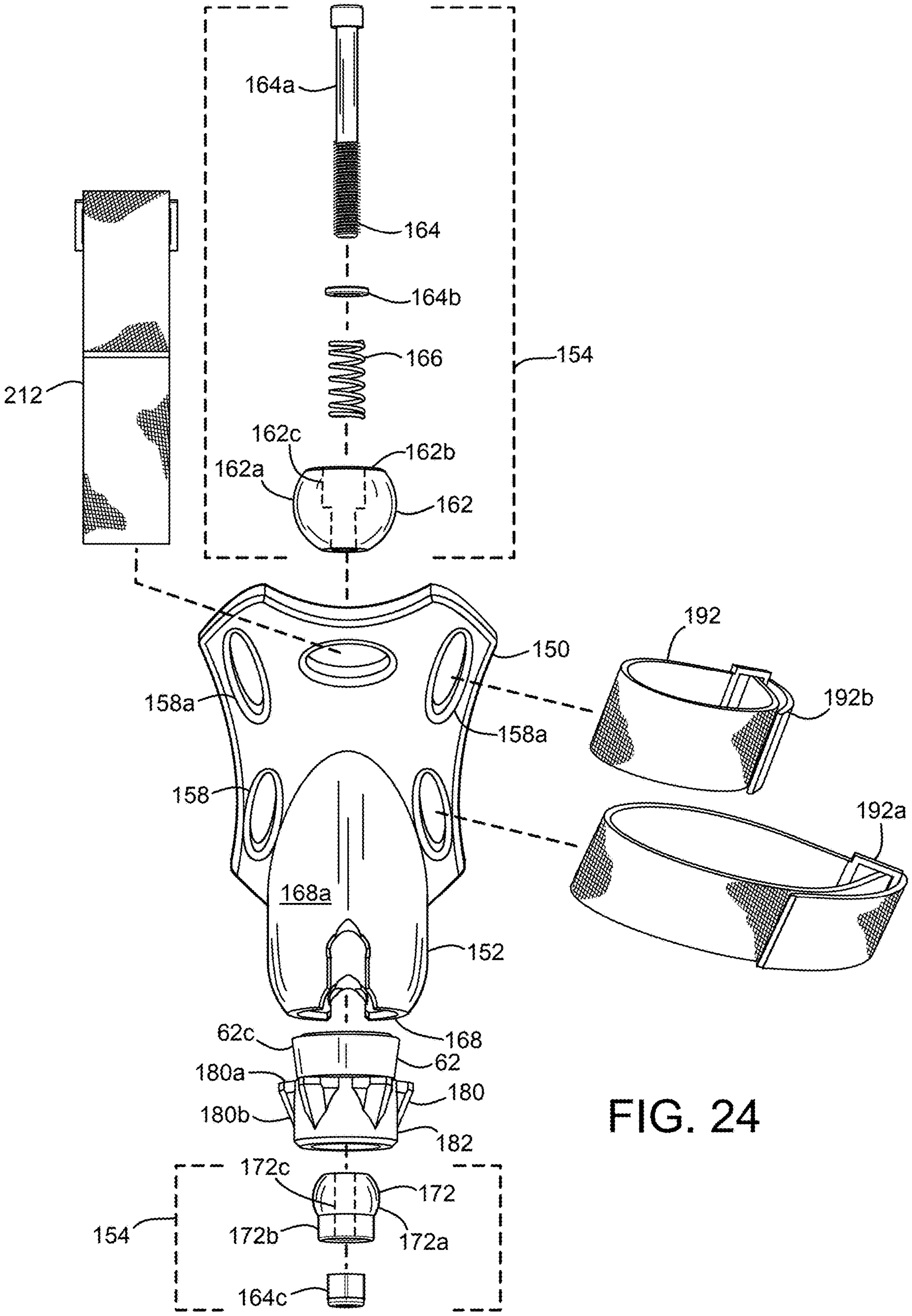
FIG. 24 is a top exploded view of a shoulder chassis configured with a curvilinear shoulder plate integrated with a barreled section and a dual-ball joint assembly having primary and secondary rotational elements operably connected by a connective bolt.
Figure 25:
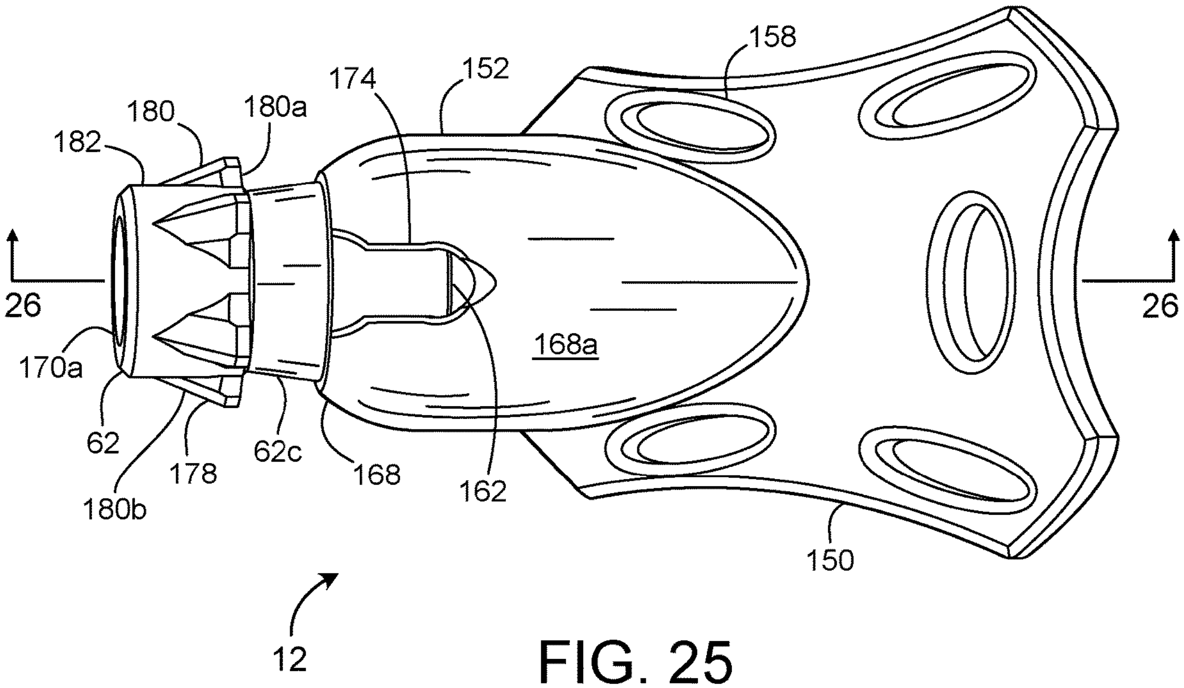
FIG. 25 is a top plan view of a shoulder chassis configured with a curvilinear shoulder plate and a lockable mechanism generally situated inline to a barreled section.
Figure 26:
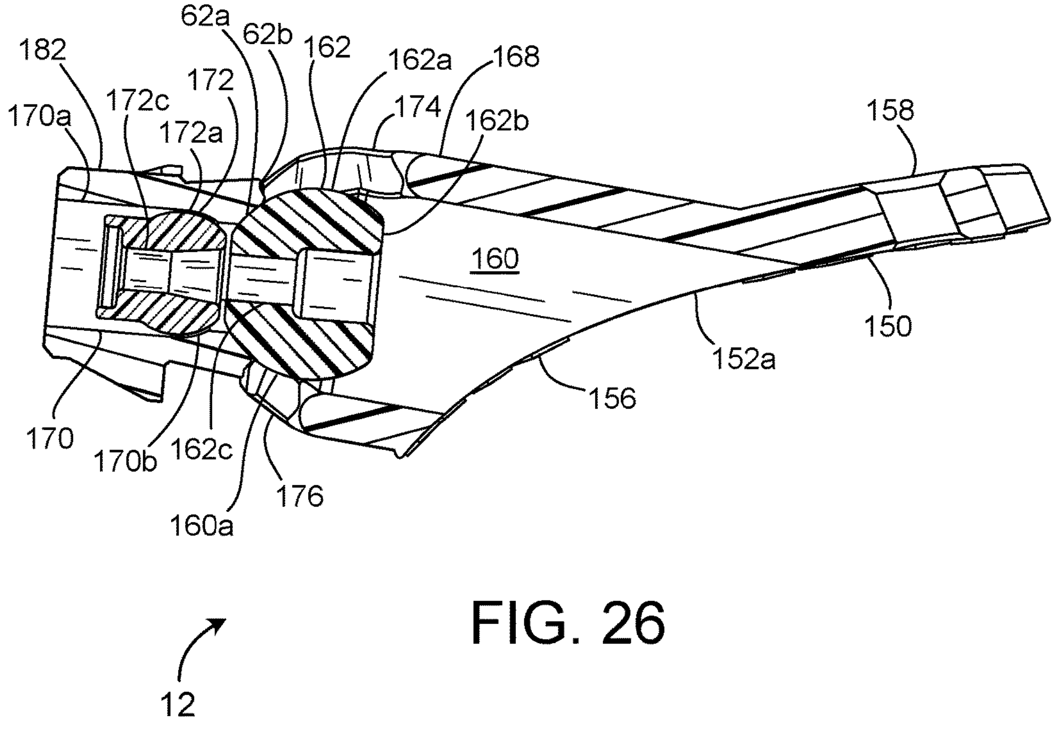
FIG. 26 is a cross sectional view of a shoulder chassis taken along line 26-26 in FIG. 25 illustrating a curvilinear shoulder plate, a barreled section housing a primary rotational element, and a lockable mechanism housing a secondary rotational element.
Figure 27:
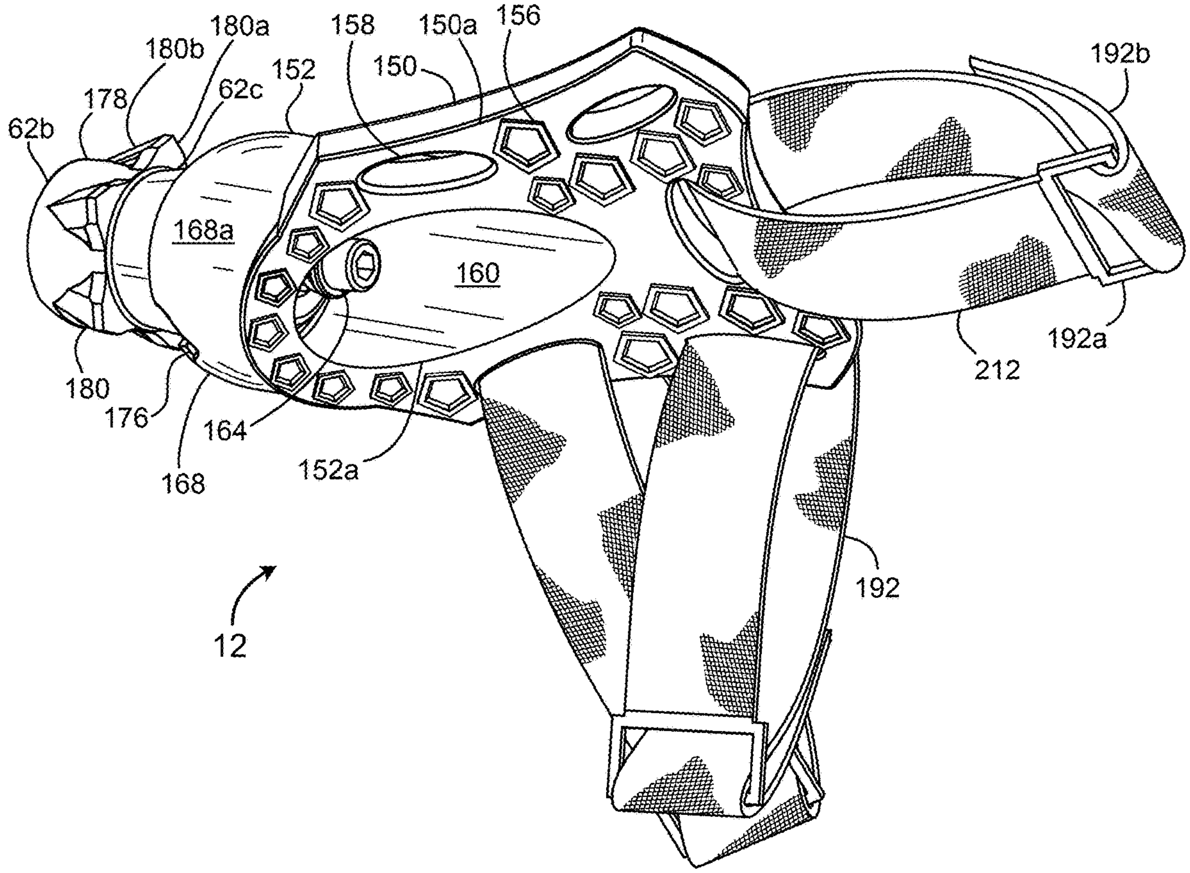
FIG. 27 is a bottom perspective view of a shoulder chassis configured with a curvilinear shoulder plate fitted with connective straps and a lockable mechanism situated exteriorly to and connected to a barreled section.
Figure 28:
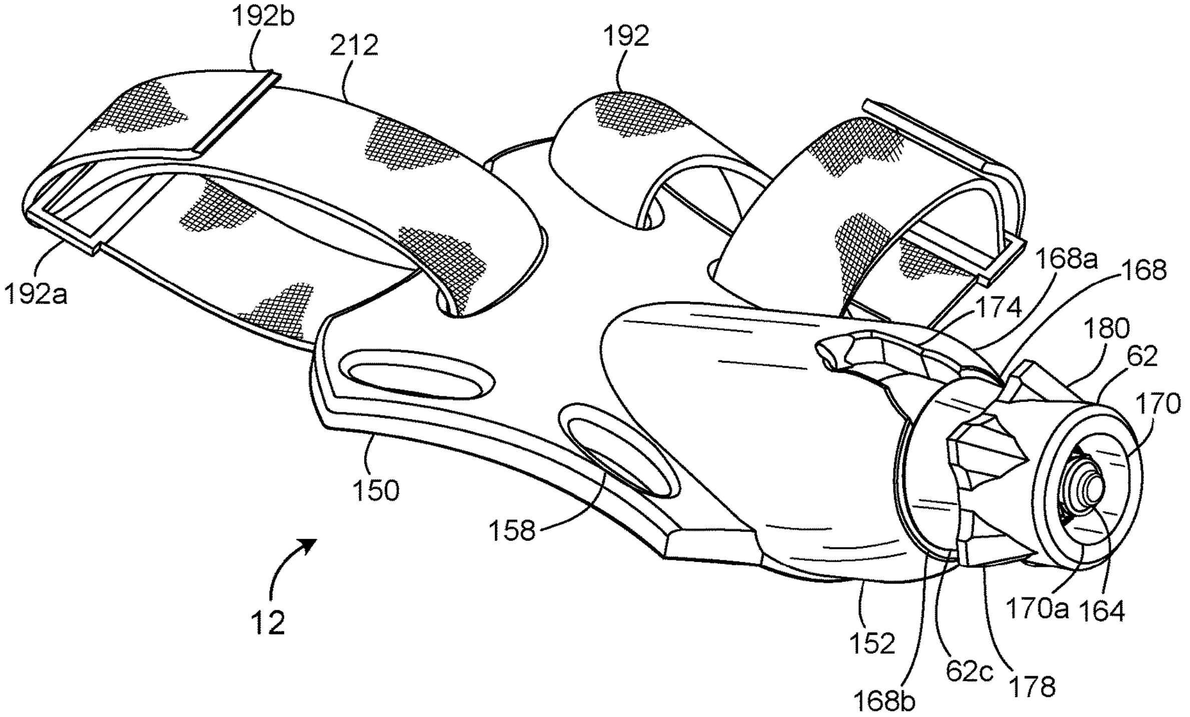
FIG. 28 is a top perspective view of a shoulder chassis configured with a curvilinear shoulder plate fitted with connective straps and a lockable mechanism situated exteriorly to and connected to a barreled section having an upper elongate slot.
Figure 29:
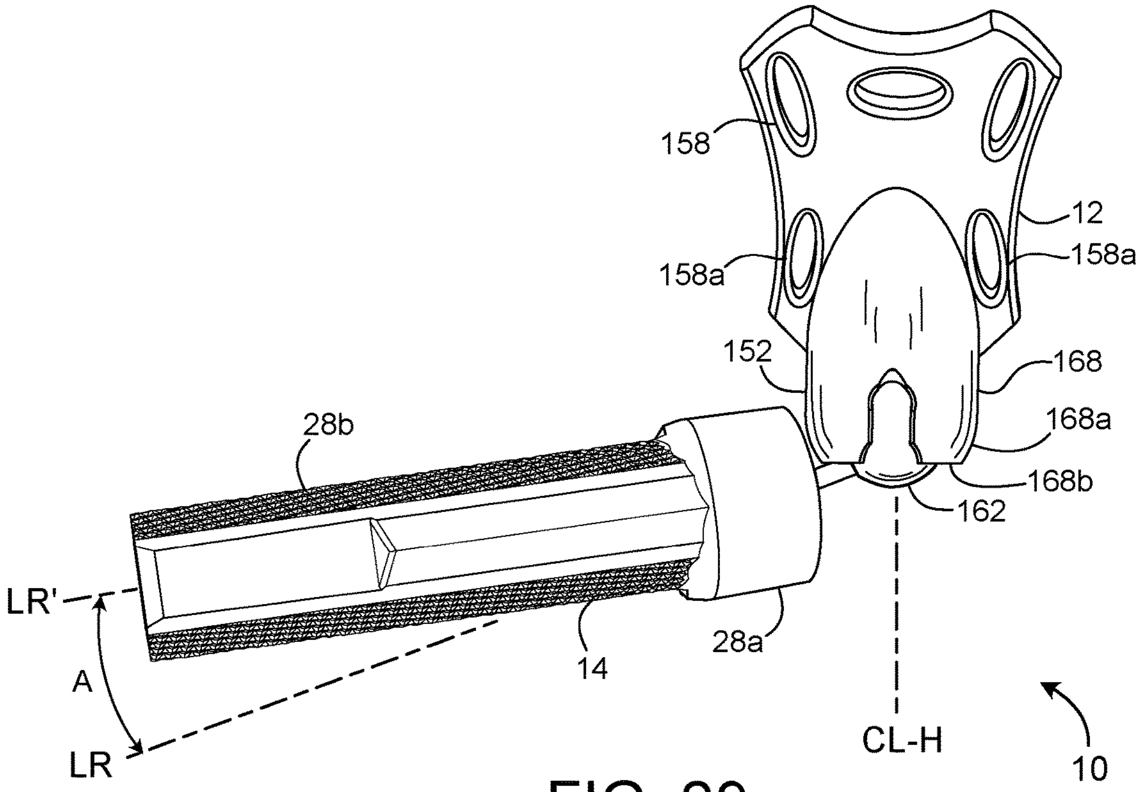
FIG. 29 is a top plan view of a stock chassis connecting to a shoulder chassis, notably illustrating the stock chassis' range of motion from a centerline horizontal position CL-H to lateral rightward positions LR and LR'.
Figure 30:
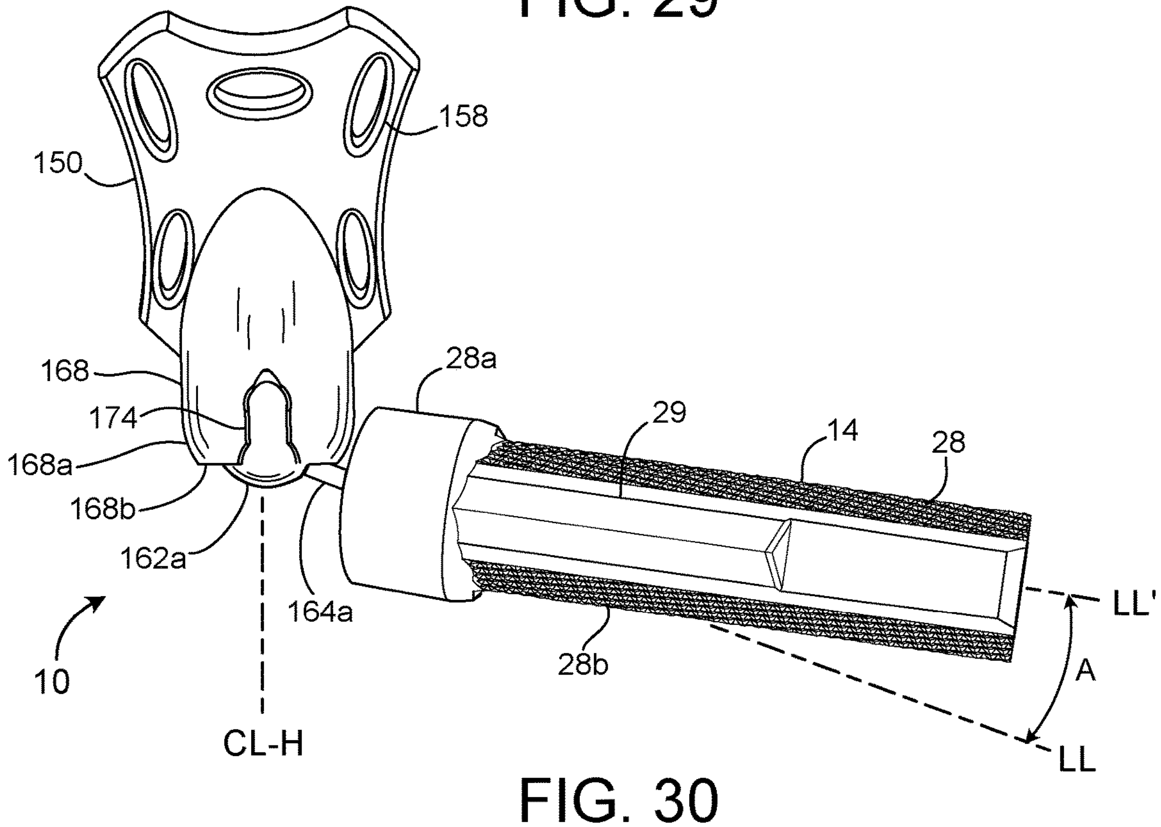
FIG. 30 is a top plan view of a stock chassis connecting to a shoulder chassis, notably illustrating the stock chassis' range of motion from a centerline horizontal position CL-H to lateral leftward positions LL and LL'.
Figure 31:
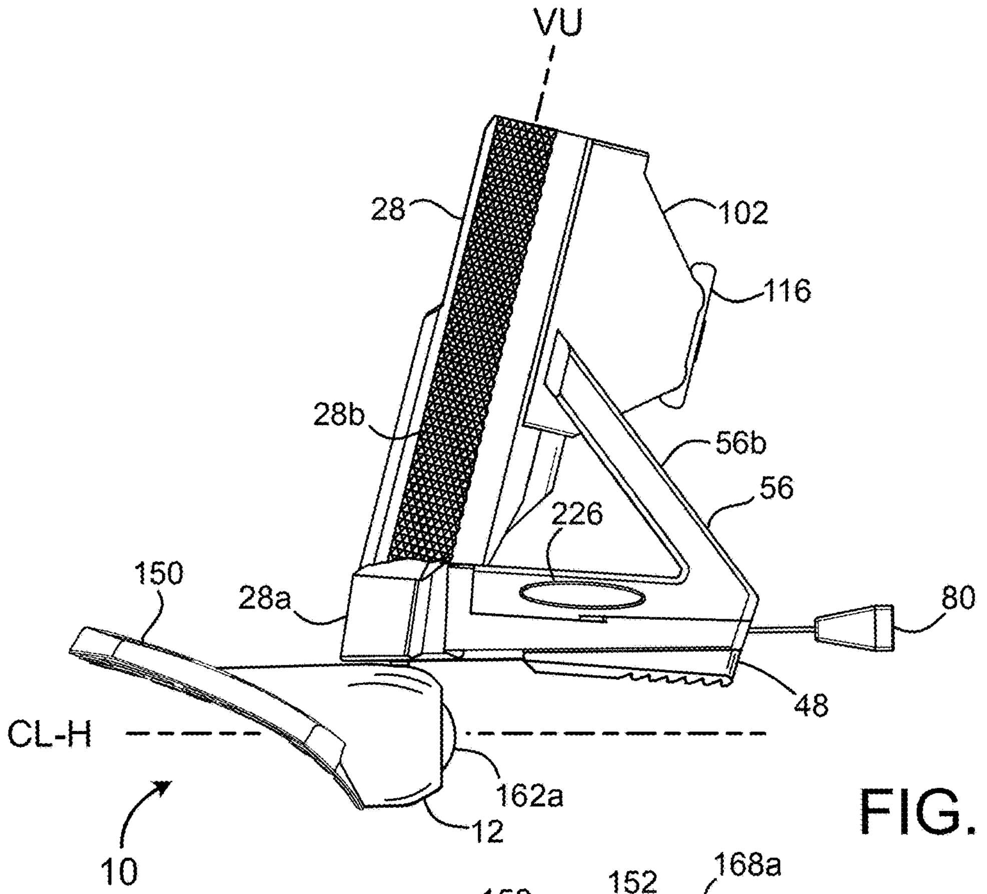
FIG. 31 is a side elevational view of a stock chassis connecting to a shoulder chassis, notably illustrating the stock chassis' range of motion from a centerline horizontal position CL-H to a vertical upward position VU.
Figure 32:
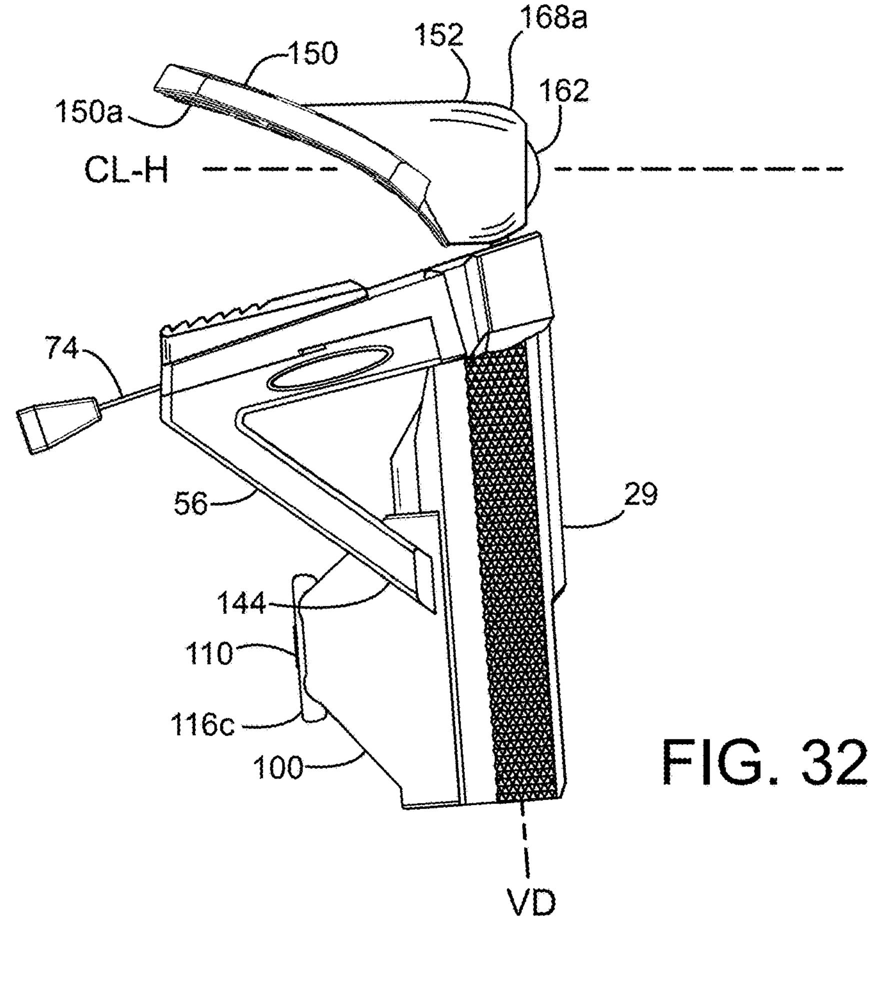
FIG. 32 is a side elevational view of a stock chassis connecting to a shoulder chassis, notably illustrating the stock chassis' range of motion from a centerline horizontal position CL-H to a vertical downward position VD.

Now in reference to FIGS. 24-26, the shoulder chassis 12 is shown therein as including a curvilinear shoulder plate 150 integrally connecting to a barreled section 152 for housing therein and connecting thereto in part a dual-ball joint assembly 154 operably associated with the lockable mechanism 62. The curvilinear shoulder plate is generally described as having an underside surface 150*a* integrally including a plurality of raised patterns 156 constituting means for mitigating lateral movement of the shoulder chassis 12 relatively about the user's shoulder or chest area and multiple elongate apertures 158 extending through and existing about the perimeter of the curvilinear shoulder plate for accepting therethrough individual straps and the like configurably arranged to affix the shoulder chassis' position relatively to the individual user. An accessible end 152*a* of the barreled section 152, as existing about the underside surface of the curvilinear shoulder plate in FIGS. 26 and 27, allows access to an interior chamber 160 for placement of a primary rotational element 162 and connecting hardware generally associated with the dual-ball joint assembly 154. In particular, the primary rotational element is shown in FIGS. 24 and 26 as having a semi-spherical portion 162*a* situated in between flattened end sections 162*b* and a graduated bore 162*c* for accepting therethrough and housing therein a shaft portion 164*a* of a connective bolt 164 and a spring 166 fitted thereabout, generally constituting in part the connecting hardware. As further evident in FIG. 26, the semi-spherical portion 162*a* of the primary rotational element, while in an assembled state, generally seats within and engages a distal curved portion 160*a* of the interior chamber 160 with one of the flattened end sections 162*b* extending beyond an open-nosed end 168 of the barreled section 152 where it is shown as engagingly fitting within a cupped entryway 62*a* of the lockable mechanism 62. The lockable mechanism is depicted in FIGS. 26 and 28 as being positioned exteriorly about the barreled section, generally in line with the open-nosed end 152*b*, and includes an inner socket 170 for housing therein a secondary rotational element 172 of the dual-ball joint assembly 154. FIG. 26 illustrates the general construct of the inner socket as including a cylindrical component 170*a* integrally transitioning to an inward curvilinear lip 170*b*, of which definably separates the inner socket from the cupped entryway 62*a* of the lockable head. Like the primary rotational element 162, the secondary rotational element 172 includes a semi-spherical portion 172*a* but integrally connects to and extends from a cylindrical portion 172*b*, whereby a centralized bore 172*c* extends through the individual connecting structures to the likes shown in FIGS. 24 and 26. Unified, but moveable connection of the primary and secondary rotational elements 162, 172 with respect to one another is advanced by the connective bolt 164, where it is depicted in FIGS. 24 and 27 as being fitted with the spring 166 and washer 164*b* before placement within the aligned arrangement of graduated and centralized bores 162*c*, 172*c*. Fixation of the connective bolt within the bores is provided by a nut 164*c* being threadably attached to its end, whereupon selective tightening of the nut pre-tensions the spring to a desired operable amount, thus impacting the extent by which the primary and secondary rotational elements can freely move apart from one another and respectively rotate minimally within the distal curved portion 160*a* and inner socket 170 during operational moments. Accordingly, in this regard, manually manipulating movement of the stock chassis 14 while in a connective state with the lockable mechanism 62, laterally from side to side, generally from a center-line horizontal CL-H position to angular leftward or rightward positions LR, LL as in FIGS. 29 and 30, correspondingly advances a circumferential edge 62*b* of the cupped entryway 62*a*, as structurally depicted in FIG. 26, to slidably traverse over and above an exterior portion 168*a* of the open-nosed end, while at the same time, modestly compressing the spring 166 from its static, pre-load state with the further effect of separating the spatial relationship of the primary and secondary rotational elements. Given the capacity for separation of the primary and secondary rotational elements and ability of each to minimally rotate respectively within the distal curved portion and inner socket, additional angular movement of the lockable mechanism 62 of at least 10 degrees beyond positions LR, LL can be established along path A before arriving at its fully extended angular positions LR', LL', with the shaft portion 164*a* of the connective bolt 164 being observably in contact with a leading edge 168*b* of the open-nosed end, as generally depicted in FIGS. 29 and 30. Equally in this regard, the lockable mechanism 62 possesses innate capability to move upwardly from position CL-H or from positions LR, LL or LR', LL' by swivelly manipulating the lockable mechanism to the likes previously described, where in this instance, the separational movement of the primary and secondary rotational elements 162, 172 allows the shaft portion 164*a* of the connective bolt 164 to engagingly fit within an upper elongate slot 174 or a lower elongate slot 176 such to respectively establish a near upward or downward vertical orientation UV, DV of the lockable mechanism and connecting stock chassis 14 with respect to the barreled section 152, as generally depicted in FIGS. 31 and 32.

Figure 14:
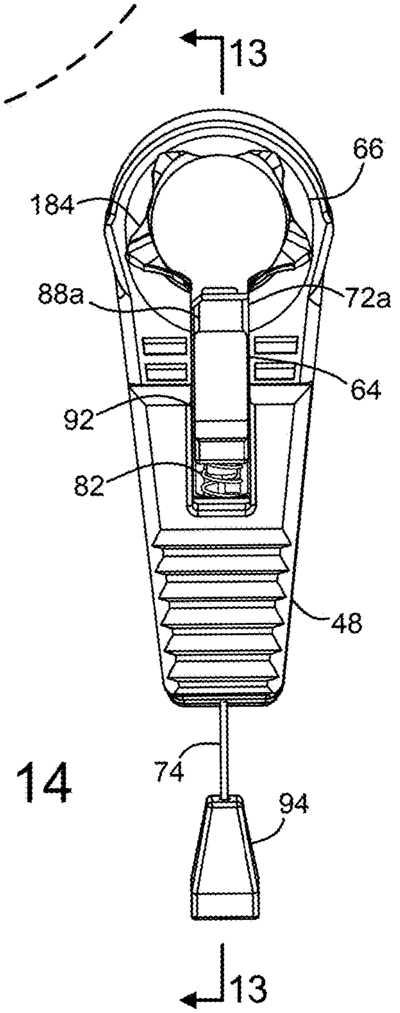
FIG. 14 is a left elevational view of a stock chassis configured with an angular frame member having a butt pad attached thereto and a mechanical handle positioned within an elongate open slot integral to the angular frame member.

In advancing a connective relationship of the stock chassis 14 to that of the shoulder chassis 12, the lockable mechanism 62, as generally depicted in FIGS. 24 and 25, duly incorporates a star-shaped head 178 having at least five triangulated protuberances 180 spaced evenly about an outer circumferential surface 182 of the cylindrical component 170*a* and an outwardly angular section 62*c* integrally extending from the outer circumferential surface and terminating at the circumferential edge 62*b*. In particular, each of the triangulated protuberances includes a triangular-facing element 180*a* and sides 180*b* extending and tapering downwardly therefrom toward the outer circumferential surface, wherein the triangular-facing element is directionally orientated toward the cupped entryway 62*a* and definably separates the outwardly angular section 62*c* from the outer circumferential surface. Comparatively, as in FIGS. 13 and 14, the heel end 28*a* of the elongate body 28 shows the open-ended chamber 66 in open communication with the throughput bore 30 of the elongate body, where in particular the open-ended chamber 66 is configured with triangulated indentations 184 forming a star-shaped receptacle 186 geometrically suited to slidably accept and spatially accommodate therewithin the triangulated protuberances 180, with the number of triangulated indentations being one less than the number of triangulated protuberances. At the onset of furthering a semi-permanent connective relationship of the stock chassis 14 to that of the shoulder chassis, as in FIG. 33, any one of the five triangulated protuberances of the star-shaped head 178, denoted herein as a locking triangulated protuberance for purposes of describing its operation, is capable of engagingly interacting with the chamfered corner 88*a* of the raised portion 88 associated with the slider plate 72, whereupon the slider plate will actively move downwardly to compress its associative spring 82 a modest amount until an acceptable amount of space is made to allow passage of the locking triangulated protuberance. After fully seating the star-shaped head 178 within the geometrically conforming star-shaped receptacle 186, the slider plate will move upwardly as a result of the spring's inherent resiliency such to eventually return the slider plate to its static position or previously-held state, while the inward side 72*b* of the slider plate 72 will selectively engage with the triangular-facing element 180*a* of the locking triangulated protuberance to establish an overall locking relationship of the star-shaped head within the star-shaped receptacle, with the locking triangulated protuberance being observably situated in-line with the channel 32 of the throughput bore 30, in absence of being fitted within one of the triangulated indentations 184.

Figure 34:
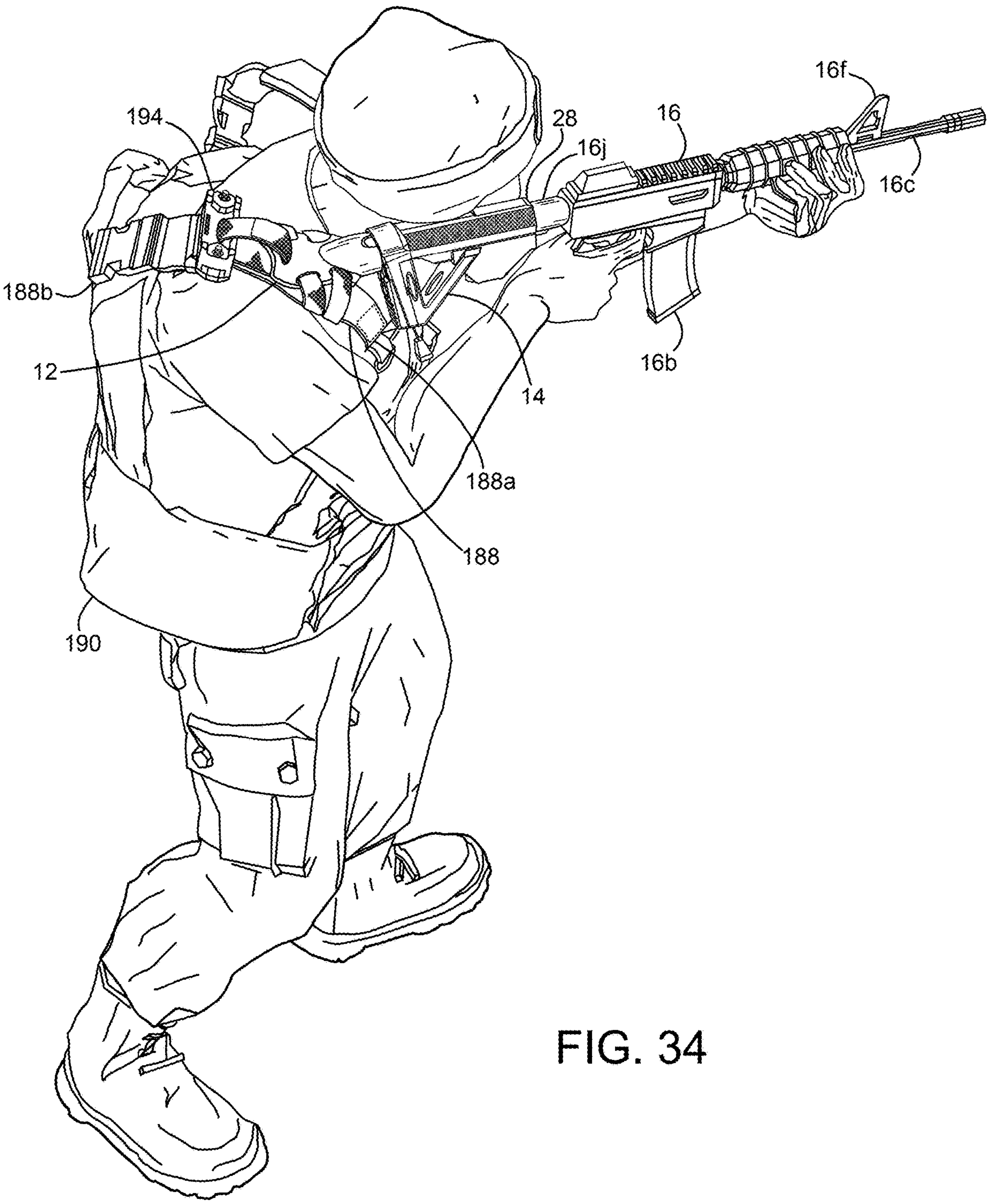
FIG. 34 is a top perspective view of an individual user being fitted with and using a weapon stabilization device aptly attached to a weapon in the form of a long gun.

Besides the connective relationship with the stock chassis 14 as previously discussed thus far, the shoulder chassis 12 largely operates alongside one or more ancillary straps 188 of the type typically associated with a vest 190 shown in FIG. 34, backpack, jacket, and so forth, wherein the individual ancillary straps may be particularly arranged to engagingly extend over the user's shoulder area with one end 188*a* thereof being affixedly attached to its associative article and the other end being adjustably affixed by way of a buckle 188*b* or an equivalent connective mechanism.

Figure 35:
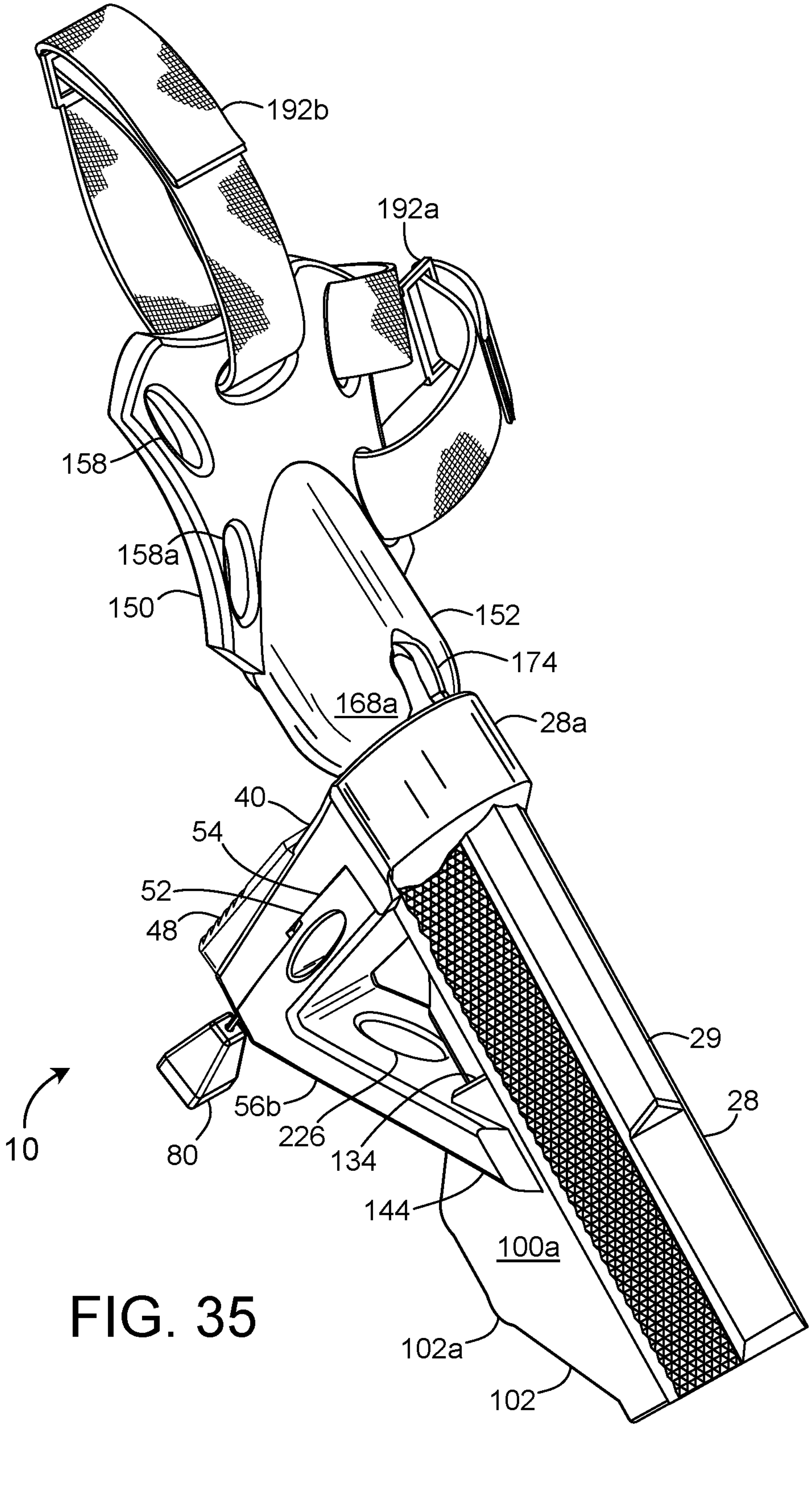
FIG. 35 is a top perspective view of a shoulder chassis connecting generally inline to a stock chassis having an elongate body configured with a pin-lock release assembly.

As reflective in FIGS. 34 and 35, the shoulder chassis is generally shown therein as fitting and connecting to the individual user primarily by way of a pair of connective straps 192 engagingly fitting and encircling at least one of the ancillary straps 188, with each of the connective straps being configured to pass through an opposing arrangement of elongate apertures 158*a* integral to the curvilinear shoulder plate 150 and held thereat by way of a buckle 192*a*, hook-and-loop fastener, or equivalent connecting means positioned at ends 192*b* of the connective straps.

Figure 36:
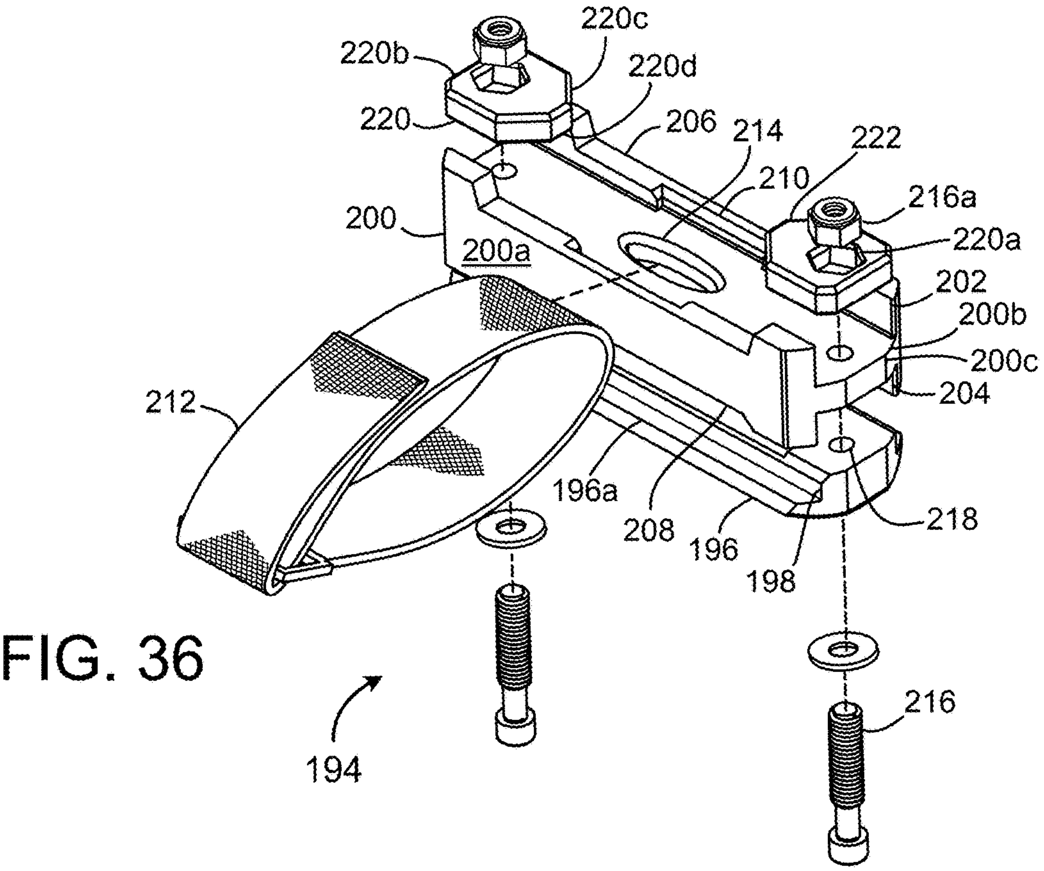
FIG. 36 is a top perspective view of a strap anchor having a unitive plate configured with an elongate locking bar and a receiver base configured with upper and lower channels.
Figure 37:
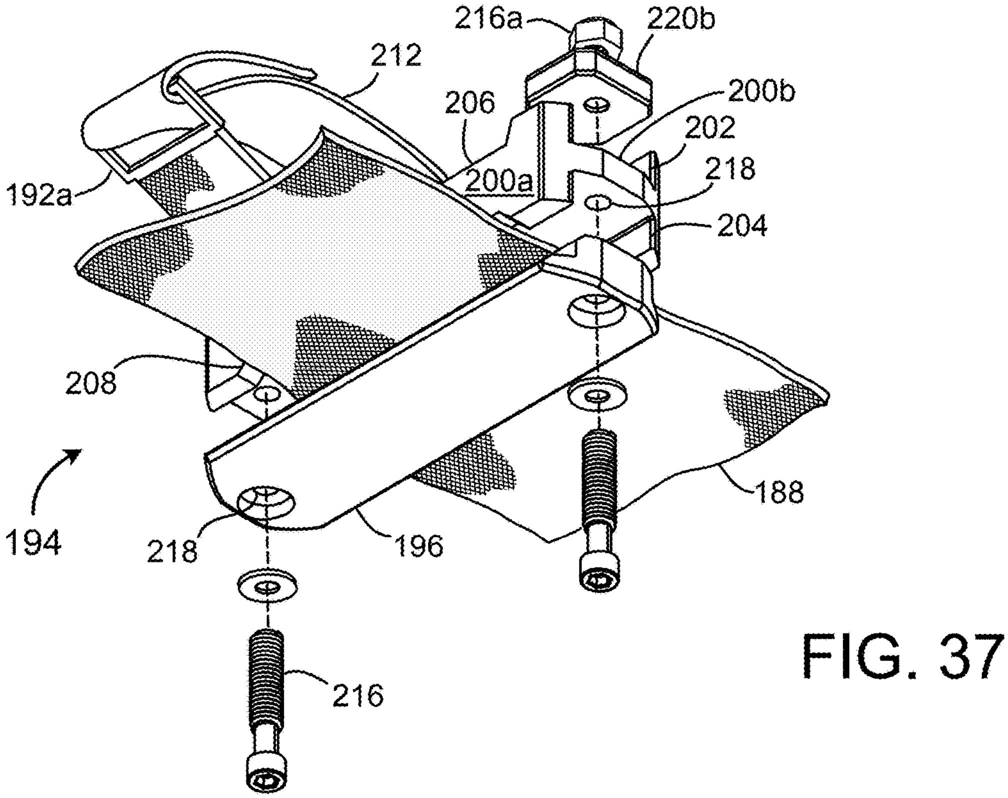
FIG. 37 is a bottom perspective view of a strap anchor having a unitive plate and a receiver base suited to accept and lockingly engage thereinbetween a select portion of an ancillary strap.

In further association with the shoulder chassis 14 and its connective relation to the stock chassis as described hereinbefore, the weapon stabilization device 10 incorporates use of a strap anchor 194 for advancing connectivity of the shoulder chassis 12 to the user's shoulder or chest area, besides that of the pair of connective straps. The strap anchor in particular is shown in FIGS. 36 and 37 as including a unitive plate 196 configured with an elongate locking bar 198 integrally connecting to and extending downwardly from a top surface 196*a* of the unitive plate and a receiver base 200 incorporating an upper channel 202 and a lower channel 204 each geometrically configured for receiving and accommodating therein the elongate locking bar. The receiver base, as in FIGS. 36 and 37, possesses the capability to operate reversibly to accommodate ancillary straps 188 of varying dimension and thickness, and, as such, includes a pair of upper indentations 206 individually configured with a shallower profile or depth relatively to a pair of lower indentations 208, with the upper channel 202 likewise including a shallower profile or depth relatively to the lower channel. As further shown in FIGS. 36 and 37, each of the upper and lower indentations, as generally integrated within a pair of sidewalls 200*a* of the receiver base, includes strap notches 210 each integrated therewithin and situated approximately midway thereabout to spatially accommodate passing of a rearward connective strap 212 that duly links the strap anchor 194 to the curvilinear shoulder plate 150. The rearward connective strap is shown in FIG. 36 as generally passing and looping through an internal aperture 214 extending through a mid-surface 200*b* of the receiver base with portions of the rearward connective strap passing through one of the upper or lower indentations configured with the strap notch, simultaneously with that of the ancillary strap, and below the receiver base in noted absence of a connecting unitive plate. Connectivity of the unitive plate with that of the receiver base is fulfilled by a pair of washer-fitted bolts 216 each passing through an aligned arrangement of apertures 218 extending through the unitive plate 196 and mid-surface 200*b* of the receiver base 200 and being threadably fitted with a nut 216*a* of the type capable of being placed within a recess 220*a* associated with an irregular-shaped spacer 220. The irregular-shaped spacer in this regard is configured with a first flattened side 220*b* generally conforming to sit flush with an end 200*c* of the receiver base and a pair of angular sides 220*c* converging to a second flattened side 220*d* forming a protrudable handle 222, which in some instances of non-use, resides in proximity to the strap notches 210, as generally shown in FIG. 36. Alternatively, the protrudable handle and first flattened side may be interchangeably positioned such that the protrudable handle extends beyond each end 200*c* of the receiver base 200 to assistively serve in manually manipulating or adjusting the strap anchor 194 while being used in its directed capacity.

Now by way of briefly describing the assembly and operation of the weapon stabilization device 10, one may appreciably gain further insight into the relatedness and interaction of the operative components discussed thus far that principally fulfill the utilitarian objects of the present invention.

It has been shown thus far that the weapon stabilization device 10 primarily includes a stock chassis 14, shoulder chassis 12 and strap anchor 194 selectively arranged and connected to one another to fulfill the most notable objectives of stabilizing and carrying the weapon during operational use thereof, as well as other recognizable objectives in the nature of facilitating ease by which the present invention can be readily assembled for use in the field and disassembled and re-assembled of purposes of cleaning, repairing and replacing inherent structural components.

Figure 38:
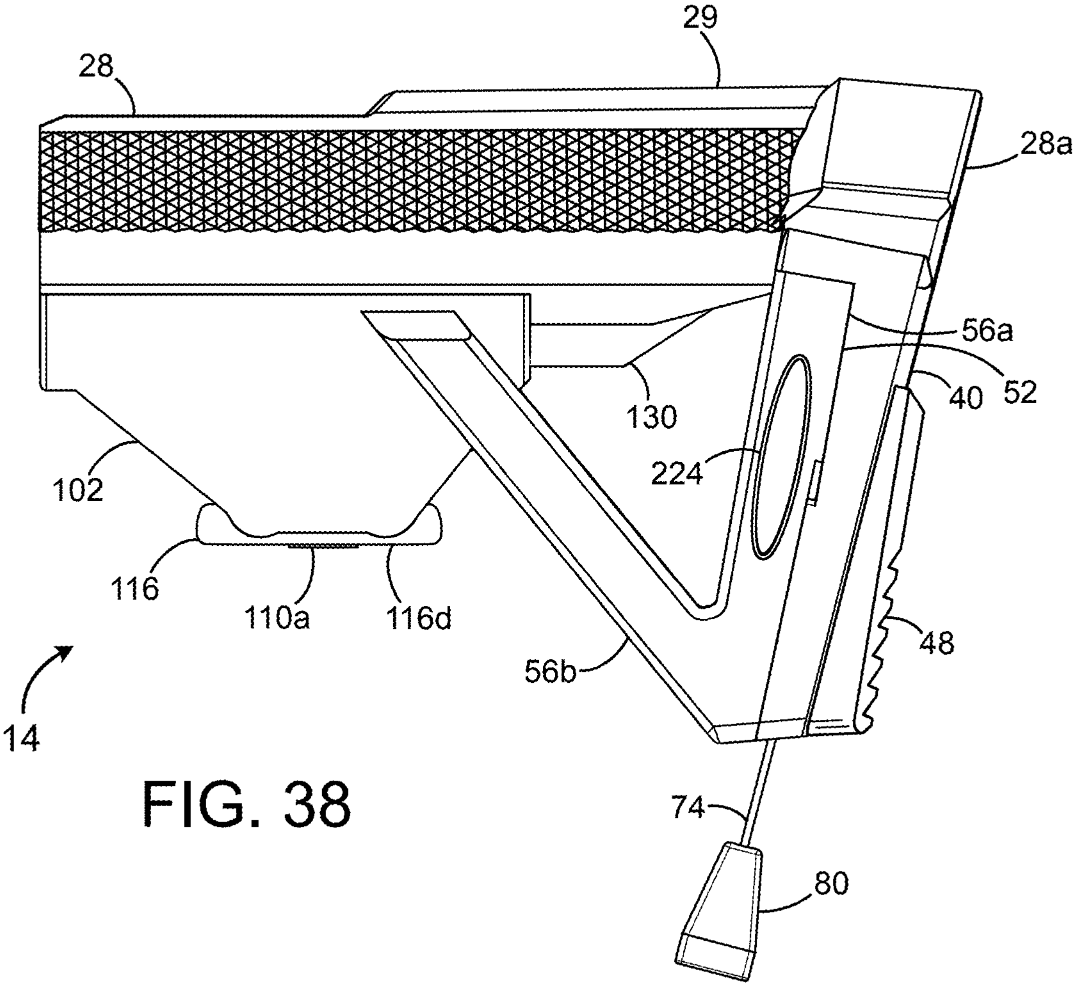
FIG. 38 is a side elevational view of a stock chassis configured with a pin-lock release assembly mounted to an elongate body and a V-shaped brace connected to a pin housing and an angular frame member.
Figure 39:
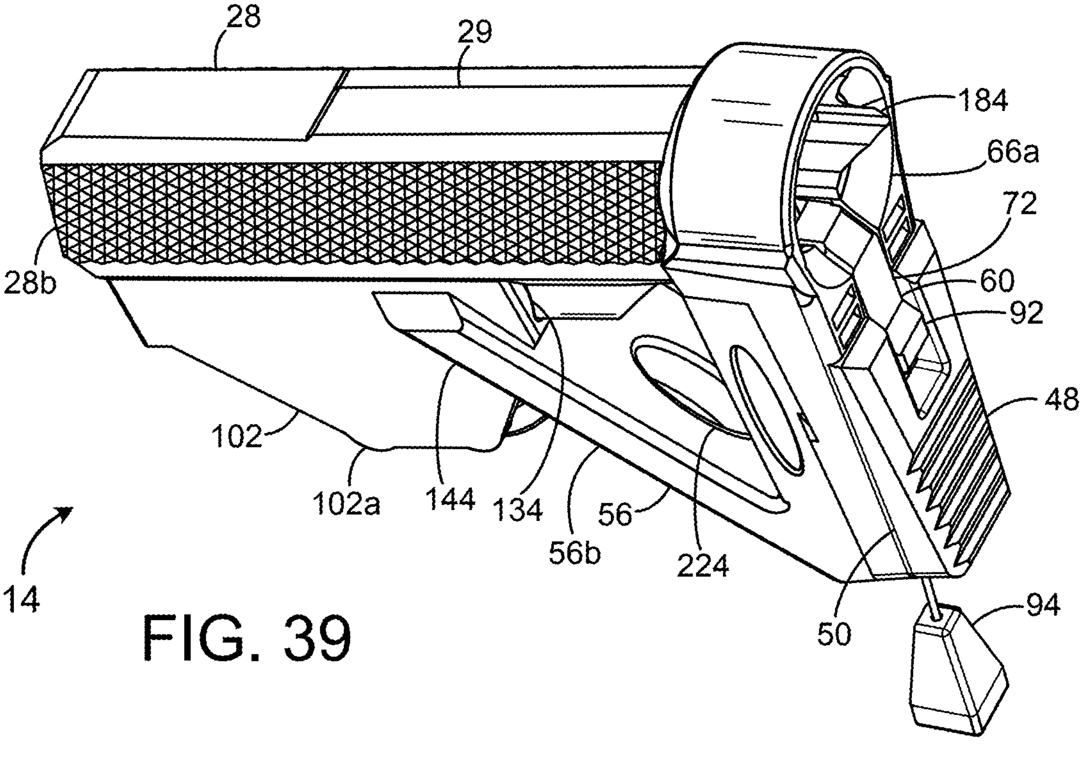
FIG. 39 is a top perspective view of a stock chassis configured with a pin-lock release assembly situated below and mounted to an elongate body and a V-shaped brace connected to a pin housing and an angular frame member having a butt pad attached thereto.

In FIGS. 38 and 39, the elongate body 28 of the stock chassis is generally shown therein as incorporating the pin lock-release assembly 100 for managing connectivity with the buffer tube and adjustability thereof with respect to the weapon 16. In fulfilling adjustability of the stock chassis in this regard, with one hand tightly grasping the elongate body as aptly configured exteriorly with a textured pattern 28*b* while equally grasping accessible ends 116*c* of the pin pull plate 116 with the other hand and turning its orientation approximately 90 degrees to rest upon extending sidewalls 102*a* integral to the pin housing 102 and existing relatively along a pair of lengthened sides 116*d* of the pin pull plate in its static state, correspondingly allows the buffer tube 16*j* to slidably pass within the throughput bore 30 without obstruction or hinderance of the adjustable pin 110. After positionally aligning either the first bore 132 or second bore 146 with the pin bore 108 and one of the notches 24 of the buffer tube, which depends on the preferred orientation of the pin housing 102 of the pin-lock release assembly 100 relative to the elongate body, release of the pin pull plate lockingly engages the top end portion 110*d* of the adjustable pin 110 with the notch and fixates the stock chassis' position relative to the weapon 16. FIGS. 38 and 39 further illustrate the butt pad 48 being fixedly attached to the angular frame member 40 of the stock chassis 12 to advance use and comfort of the weapon apart from attachment of the shoulder chassis, if desired. The first support 56*a* of the V-shaped brace 56 is generally shown in FIG. 13 as being attached to the angular frame member by screws 57 with a pass-through notch 224 integral to the first support being held in alignment with the channel 32 of the throughput bore 30 and the second support 56*b* being fixedly attached to the mounting rail 130 integral to the elongate body 28 by way of the holding screw 136, with sideward projections 144 of the V-shaped brace 56 engaging alongside the pin housing 102.

Figure 33:
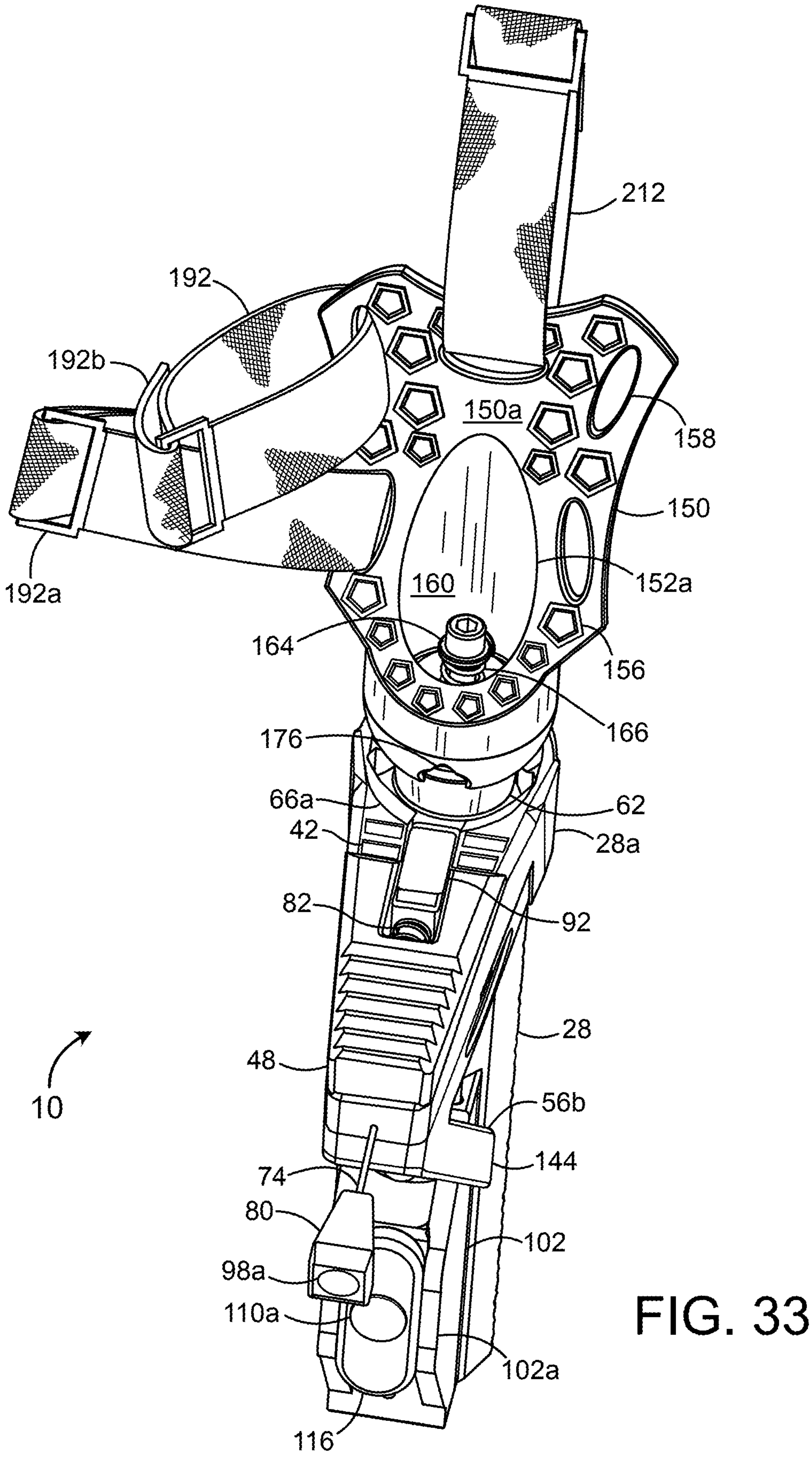
FIG. 33 is a bottom perspective view of a shoulder chassis connecting to a stock chassis and being configured with connective straps.

Comparatively, the shoulder chassis 12 is shown in FIG. 33 as being operably attached to the stock chassis 14 by way of positioning and allowing the star-shaped head 178 of the lockable mechanism 62 to engagingly interact with the upper portion 72*a* of the slider plate 72 to effect compression of the spring 82 and corresponding downward movement of the slider plate until ample space is provided to slidably position the star-shaped head within the confines of the geometrically conforming star-shaped receptacle 186. After placement in this regard, the slider plate, due to the spring's inherent properties to return to an uncompressed state, the inward side 72*b* of the slider will aptly engage the triangular-facing element 180*a* of the locking triangulated protuberance to lock in place the lockable mechanism. Release of the star-shaped head from the star-shaped receptacle 186 is fulfilled by manually manipulating the mechanical handle 92 downwardly or grasping and pulling downwardly the handle assembly 80 connecting to the cable pull 74 configurably attached to the slider plate 72, correspondingly of which compresses the spring 82 and advances downward movement of the slider plate until once again ample space is provided to slidably move and disengage the star-shaped head 178 from the star-shaped receptacle 186. Prior to or after assembly in this regard, there may be an instance or a need to establish the requisite amount of tension in the spring 166 associated with the primary and secondary rotational elements 162, 172 of the dual-ball joint assembly 154 insofar to effectuate proper movement of the cupped entryway 62*a* of the lockable mechanism 62 relatively over and about the exterior portion 168*a* of the open-nosed end 168. In this regard, tightening or loosening the nut associated with the connective bolt 164 correspondingly reflects the degree by which the primary and secondary rotational elements 162, 172 can separate and slidably travel over the exterior portion 168*a* of the open-ended nose, particularly in a manner that allows the stock chassis 14 and connecting weapon 16 to freely move laterally left or right to the full extent of positions LF' and LR' in FIGS. 29 and 30 as well as vertically up or down to positions VU or VD in FIGS. 31 and 32. Besides the connective relationship between the stock chassis and shoulder chassis 12, FIG. 34 generally illustrates the manner in which the shoulder chassis fits and connects to the individual user, where in particular the individual connective straps 192 engagingly encircle at least one of the ancillary straps 188 associated with the vest 190, backpack or other like-wearable accessory and configurably pass through the opposing arrangement of elongate apertures 158*a* integral to the curvilinear shoulder plate 150 before being connected relatively about its ends with the buckle 192*a*, hook-and-loop fastener, or equivalent connective mechanism.

In furthering securement of the shoulder chassis 12 generally about the shoulder or chest area of the user, besides that of the connective straps denoted above, the weapon stabilization device 10 advances use of the strap anchor 194 aptly linked to the shoulder chassis as well as being attached to one of the available ancillary straps 188. In this regard, the rearward connective strap 212 is exemplary shown in FIGS. 36 and 37 as engagingly fitting and looping through the internal aperture 214 and passing outwardly through and over one of the lower indentations 208 simultaneously occupied by the ancillary strap 188 for hold by the connecting unitive plate as well as passing over one of the upper indentations 206 in absence of the unitive plate 196 where the rearward connective strap can become available to engagingly loop through the elongate aperture 158 positioned most rearward about the curvilinear shoulder plate 150, as generally depicted in FIGS. 33 and 35.

In further respects, FIGS. 34 and 37 generally illustrate the ancillary strap 188 passing through either the upper or lower indentations 206, 208 of the receiver base 200, selectivity of which depends on the dimensional thickness of the ancillary strap, while respectively bridging across either the upper or lower channel 202, 204. Fixation of the strap anchor 194 relatively about the ancillary strap is fulfilled by the placement of the elongate locking bar 198 of the unitive plate into either the upper or lower channel and connecting together the unitive plate and receiver base with the requisite washer-fitted bolts 216 threadably attached to nuts 216*a*. FIGS. 34 and 36 reflects the proper orientation of the strap anchor 194 while in operative use on the individual wearer, where in particular the nuts 216*a* individually fitted within the recess 220*a* of the irregular-shaped spacer 220 face upwardly, whereas the unitive plate 196 faces downwardly to engage the ancillary strap 188.

In furthering advanced connectivity of the stock chassis 14 to the individual user or connect ancillary items apart from the weapon stabilization device 10, each of the first and second supports 56*a*, 55*b* of the V-shaped brace 56 incorporate one or more ancillary apertures 226 suited to accept and pass therethrough straps, hooks or equivalent.

It is obvious that the components comprising the weapon stabilization device 10 may be fabricated from a variety of materials, providing such selection or use of materials possess the capacity to withstand forces acting thereon throughout its duration of use, most notably in outdoor environments. Accordingly, it is most desirable, and therefore preferred, to fabricate the stock chassis 14, shoulder chassis 12 and strap anchor 194 from plastic, polymer composites, or an equivalent type of material that meaningfully offers reasonable structural strength for its weight, while limiting the extent by which the components may unacceptably fail due to applied forces. Injection molding and 3D printing technologies are particularly preferred in manufacturing the weapon stabilization device due to fulfilling dimensional accuracy and acceptable tolerances while yielding unified construction.

While there has been shown and described a particular embodiment of the invention, it will be obvious to those skilled in the art that various changes and alterations can be made therein without departing from the invention and, therefore, it is aimed in the appended claims to cover all such changes and alterations which fall within the true spirit and scope of the invention. For instance, the curvilinear shoulder plate 150 may differ in size, aesthetics and perhaps in form to fulfill certain conditions or requirements of use, such as to conform to certain body types and dimensions. Thus, the scope of the invention should be determined by the appended claims and their legal equivalents rather than by the examples set forth herein.

The invention claimed is:

1. A weapon stabilization device for supporting a weapon equipped with a buffer tube, the weapon stabilization device comprising, in combination:

a stock chassis having an elongate body configured with a throughput bore for accepting therein an end of the buffer tube and an angular frame member integrally connecting to a heel end of the elongate body;

a mounting rail integrally connecting to and extending below said elongate body;

a pin-lock release assembly having a pin housing configured with a mounting channel capable of slidably fitting to said mounting rail and an adjustable pin, said mounting rail and said mounting channel respectively having a first bore and a pin bore in an aligned arrangement for accepting therein and passing therethrough said adjustable pin to lockingly intercept the buffer tube; and a shoulder chassis swivelly connecting to said heel end of the elongate body.

2. The weapon stabilization device as set forth in claim 1, further comprising a V-shaped brace having a first support connecting to said angular frame member and a second support connecting to said pin-lock release assembly.

3. The weapon stabilization device as set forth in claim 2, wherein said shoulder chassis comprises a dual-ball joint assembly having a primary rotational element and a secondary rotational element and a curvilinear shoulder plate having a barreled section for housing said primary rotational element.

4. The weapon stabilization device as set forth in claim 3, wherein said shoulder chassis comprises a lockable mechanism connecting to said dual-ball joint assembly, said lockable mechanism having an inner socket for housing said secondary rotational element.

5. The weapon stabilization device as set forth in claim 4, wherein said angular frame member comprises a primary relief and a second relief situated within said primary relief, an elongate open slot situated within said secondary relief, and an integrated semi-cylindrical notch in open communication with said primary and secondary reliefs.

6. The weapon stabilization device as set forth in claim 5, further comprising a lock release assembly having a slider plate slidably positioned within said secondary relief and configured with a raised portion extending through said elongate open slot, a cylindrical support attaching to and extending downwardly from said slider plate, and a spring fitting relatively about said cylindrical support for collective positioning within said integrated semi-cylindrical notch.

7. The weapon stabilization device as set forth in claim 5, wherein said first support of the V-shaped brace comprises a raised portion geometrically corresponding to and fitting within the spatial confines of said primary relief.

8. The weapon stabilization device as set forth in claim 6, wherein said lockable mechanism comprises a star-shaped head and said elongate body comprises an open-ended chamber in proximity to said heel end and being configured as a star-shaped receptacle capable of receiving therewithin said star-shaped head to fulfill a connective relationship between said stock chassis and said shoulder chassis.

9. The weapon stabilization device as set forth in claim 8, wherein said star-shaped head comprises at least five triangulated protuberances equally spaced about an outer circumferential surface of the lockable mechanism and said star-shaped receptacle comprises triangulated indentations geometrically configured to accommodate therewithin said triangulated protuberances, with the number of said triangulated indentations being one less than the number of said triangulated protuberances.

10. The weapon stabilization device as set forth in claim 9, wherein each of said triangulated protuberances comprises a triangular-facing element with one of said triangulated protuberances being selectively positioned to engage with an upper portion of the slider plate to lock in place said lockable mechanism relatively with that of said stock chassis.

11. The weapon stabilization device as set forth in claim 10, wherein said raised portion of the slider plate comprises a chamfered corner capable of initially interacting with one of said triangulated protuberances to forcibly push downward said slider plate and compress said spring upon placing said star-shaped head within said star-shaped receptacle, whereby the resiliency of said spring positions said triangular-facing element of one of the triangulated protuberances to lockingly engage with said upper portion of the slider plate.

12. The weapon stabilization device as set forth in claim 3, wherein said curvilinear shoulder plate comprises at least one connective strap and multiple elongate apertures individually capable of passing therethrough and accepting therein said connective strap for assistively securing said shoulder chassis to an individual user.

13. The weapon stabilization device as set forth in claim 4, wherein said dual-ball joint assembly comprises a connective bolt fitted with a spring for holding together relatively to said barreled section said lockable mechanism, said primary rotational element and said secondary rotational element while enabling a predetermined amount of movement relative to one another.

14. The weapon stabilization device as set forth in claim 13, wherein said barreled section comprises an upper elongate slot and a lower elongate slot individually capable of receiving therein a shaft portion of the connective bolt to substantially establish a predetermined amount of angular orientation between said barreled section of the shoulder chassis and said elongate body of the stock chassis.

15. The weapon stabilization device as set forth in claim 1, wherein said pin-lock release assembly comprises a locking pin, an internal spring being fitted onto said adjustable pin and a spring bore integral to said pin housing for collectively housing said internal spring and a shaft portion of the adjustable pin, said adjustable pin having a series of cross bores extending through the shaft portion with one of said cross bores serving to accept said locking pin.

16. The weapon stabilization device as set forth in claim 15, wherein said pin-lock release assembly comprises a spring mount plate fastened to said pin housing for retaining the position of said internal spring within said spring bore and a pin pull plate loosely connecting to said adjustable pin.

17. The weapon stabilization device as set forth in claim 1, wherein said mounting rail comprises a second bore spatially apart from said first bore and capable of being positioned to align with said pin bore for accommodating therein said adjustable pin to effect lineal adjustment of said pin-lock release assembly relatively along said elongate body.

18. The weapon stabilization device as set forth in claim 1, further comprising a strap anchor having a receiver base configured with an internal aperture, a unitive plate attaching to said receiver base and a rearward connective strap engagingly fitting within and passing through said internal aperture and extendingly attaching to said shoulder chassis, whereby said receiver base and said unitive plate operably accept thereinbetween a portion of the rearward connective strap and a portion of an ancillary strap associatively worn on an individual user.

19. The weapon stabilization device as set forth in claim 1, further comprising a butt pad mountable to an outward face of the angular frame member.

20. The weapon stabilization device as set forth in claim 1, wherein said throughput bore of the elongate body comprises a pair of linear flanges extending longitudinally thereabout, whereby said flanges possess capability of flexing a predetermined amount within the geometric spatial confines of said throughput bore as the buffer tube is slidably positioned therewithin.

21. A weapon stabilization device for supporting a weapon equipped with a buffer tube configured with an integral bottom rail with notches, the weapon stabilization device comprising, in combination:

- a stock chassis having an elongate body configured with a throughput bore for accepting therein an end of the buffer tube and an angular frame member integrally connecting to said elongate body, said throughput bore having a channel for slidably accepting the integral bottom rail, said elongate body having a star-shaped receptacle in open communication with said throughput bore;
- a mounting rail integrally connecting to and extending below said elongate body and having a first bore and a second bore;
- a pin-lock release assembly having a pin housing configured with a mounting channel capable of slidably fitting to said mounting rail and an adjustable pin, said mounting rail having a pin bore in alignment with said first bore or said second bore for accepting therein and passing therethrough said adjustable pin to lockingly intercept one of the notches of the buffer tube; and
- a shoulder chassis having a dual-ball joint assembly configured with a primary rotational element and a secondary rotational element, a curvilinear shoulder plate having a barreled section for housing said primary rotational element, and a lockable mechanism connecting to said dual-ball joint assembly and having an inner socket for housing said secondary rotational element and a star-shaped head geometrically conforming to and fitting within said star-shaped receptacle.

22. The weapon stabilization device as set forth in claim 21, wherein said angular frame member comprises a primary relief and a second relief situated within said primary relief, an elongate open slot situated within said secondary relief, and an integrated semi-cylindrical notch in open communication with said primary and secondary reliefs.

23. The weapon stabilization device as set forth in claim 22, further comprising a V-shaped brace having a first support connecting to said angular frame member and a second support connecting to said pin housing, said first support of the V-shaped brace having a raised portion geometrically corresponding to and fitting within the spatial confines of said primary relief.

24. The weapon stabilization device as set forth in claim 23, further comprising a lock release assembly having a slider plate slidably positioned within said secondary relief and configured with a raised portion extending through said elongate open slot, a cable pull attached to said slider plate, a cylindrical support attaching to and extending downwardly from said slider plate, and a spring fitting relatively about said cylindrical support for collective positioning within said integrated semi-cylindrical notch.

25. The weapon stabilization device as set forth in claim 24, wherein said star-shaped head comprises at least five triangulated protuberances equally spaced about an outer circumferential surface of the lockable mechanism and said star-shaped receptacle comprises triangulated indentations geometrically configured to accommodate therewithin said triangulated protuberances, with the number of said triangulated indentations being one less than the number of said triangulated protuberances.

26. The weapon stabilization device as set forth in claim 25, wherein each of said triangulated protuberances comprises a triangular-facing element with one of said triangulated protuberances being selectively positioned to engage with an upper portion of the slider plate to lock in place said lockable mechanism relatively with that of said stock chassis.

27. The weapon stabilization device as set forth in claim 21, wherein said dual-ball joint assembly comprises a connective bolt fitted with a spring for holding together relatively to said barreled section said lockable mechanism, said primary rotational element and said secondary rotational element while enabling a predetermined amount of movement relative to one another, said spring being situated interiorly in part within said primary rotational element.

28. The weapon stabilization device as set forth in claim 27, wherein said barreled section comprises an upper elongate slot and a lower elongate slot individually capable of slidably receiving therein a shaft portion of the connective bolt to substantially establish a predetermined amount of angular orientation between said barreled section of the shoulder chassis and said elongate body of the stock chassis.

29. The weapon stabilization device as set forth in claim 21, further comprising a strap anchor having a receiver base configured with an internal aperture, a unitive plate attaching to said receiver base and a rearward connective strap engagingly fitting within and passing through said internal aperture and extendingly attaching to said shoulder chassis, whereby said receiver base and said unitive plate operably accept thereinbetween a portion of the rearward connective strap and a portion of an ancillary strap associatively worn on an individual user.

30. A weapon stabilization device for supporting a weapon equipped with a buffer tube configured with notches, the weapon stabilization device comprising, in combination:

a stock chassis having an elongate body configured with a throughput bore for accepting therein an end of the buffer tube and an angular frame member integrally connecting to said elongate body and having a primary relief and a second relief situated within said primary relief, an elongate open slot situated within said secondary relief, and an integrated semi-cylindrical notch in open communication with said primary and secondary reliefs, said elongate body having a star-shaped receptacle in open communication with said throughput bore;

a mounting rail integrally connecting to and extending below said elongate body and having a first bore and a second bore;

a pin-lock release assembly having a pin housing configured with a mounting channel capable of slidably fitting to said mounting rail and an adjustable pin, said mounting rail having a pin bore in alignment with said first bore or said second bore for accepting therein and passing therethrough said adjustable pin to lockingly intercept one of the notches of the buffer tube;

a V-shaped brace having a first support connecting to said angular frame member and a second support connecting to said pin housing, said first support of the V-shaped brace having a raised portion geometrically corresponding to and fitting within the spatial confines of said primary relief;

a shoulder chassis having a dual-ball joint assembly configured with a primary rotational element and a secondary rotational element, a curvilinear shoulder plate having a barreled section for housing said primary rotational element and being configured with an upper elongate slot and a lower elongate slot, and a lockable mechanism connecting to said dual-ball joint assembly and having an inner socket for housing said secondary rotational element and a star-shaped head geometrically conforming to and fitting within said star-shaped receptacle, said dual-ball joint assembly having a connective bolt fitted with a spring for holding together relatively to said barreled section said lockable mechanism, said primary rotational element and said secondary rotational element while enabling a predetermined amount of movement relative to one another, said connective bolt having a shaft portion capable of slidably fitting into said upper elongate slot or said lower elongate slot to establish a predetermined amount of angular orientation between said barreled section of the shoulder chassis and said elongate body of the stock chassis;

a lock release assembly having a slider plate slidably positioned within said secondary relief and configured with a raised portion extending through said elongate open slot, a cable pull attached to said slider plate, a cylindrical support attaching to and extending downwardly from said slider plate, and a spring fitting relatively about said cylindrical support for collective positioning within said integrated semi-cylindrical notch; and a strap anchor having a receiver base configured with an internal aperture, a unitive plate attaching to said receiver base and a rearward connective strap engagingly fitting within and passing through said internal aperture and extendingly attaching to said shoulder chassis, whereby said receiver base and said unitive plate operably accept thereinbetween a portion of the rearward connective strap and a portion of an ancillary strap associatively worn on an individual user.

* * * * *